(12) United States Patent
Murata et al.

(10) Patent No.: US 10,104,031 B2
(45) Date of Patent: Oct. 16, 2018

(54) EMAIL GENERATION DEVICE, EMAIL GENERATION METHOD, PROGRAM FOR EMAIL GENERATION DEVICE, AND STORAGE MEDIUM

(71) Applicant: Rakuten, Inc., Tokyo (JP)

(72) Inventors: Yusuke Murata, Tokyo (JP); Kenjiro Numazu, Tokyo (JP); Ruka Sakurai, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 69 days.

(21) Appl. No.: 15/025,765

(22) PCT Filed: Sep. 30, 2013

(86) PCT No.: PCT/JP2013/076611
§ 371 (c)(1),
(2) Date: Mar. 29, 2016

(87) PCT Pub. No.: WO2015/045177
PCT Pub. Date: Apr. 2, 2015

(65) Prior Publication Data
US 2016/0248713 A1   Aug. 25, 2016

(51) Int. Cl.
*G06F 15/16* (2006.01)
*H04L 12/58* (2006.01)
(Continued)

(52) U.S. Cl.
CPC ............ *H04L 51/18* (2013.01); *G06F 13/385* (2013.01); *H04L 51/08* (2013.01); *H04L 67/02* (2013.01); *H04L 67/06* (2013.01); *H04L 69/22* (2013.01)

(58) Field of Classification Search
CPC ......... G06F 13/38; H04L 51/08; H04L 67/02; H04L 67/06
(Continued)

(56) References Cited

FOREIGN PATENT DOCUMENTS

| JP | 2001-216214 A | 8/2001 |
|----|---------------|--------|
| JP | 2004-152051 A | 5/2004 |

OTHER PUBLICATIONS

Eto et al; Electronic Mail Delivery System in Electronic Commerce and Method of Deliverying Same Electronic Mail; JP 2011-070288; Apr. 7, 2011, pp. 1-18.*

(Continued)

*Primary Examiner* — Glenford Madamba
(74) *Attorney, Agent, or Firm* — Sughrue Mion, PLLC

(57) ABSTRACT

A plurality of pieces of send candidate information are stored (Step S12). Each piece of send candidate information has recipient identification information identifying a recipient of an email and an email substance (50 and 55) that are associated with each other. The email substance includes a plurality of components (51, 52, and 53). From among the stored pieces of send candidate information, two or more pieces of send candidate information that have the same recipient identification information and at least one of the components related between their email substances are extracted (S13, S14, and S15). An email substance (56) to be sent to the recipient is generated, based on common components related between the email substances of the extracted pieces of send candidate information and on components that are included in the email substances of the extracted pieces of send candidate information and that are other than the common components (S16).

9 Claims, 21 Drawing Sheets

(51) Int. Cl.
*G06F 13/38* (2006.01)
*H04L 29/08* (2006.01)
*H04L 29/06* (2006.01)

(58) Field of Classification Search
USPC .......................................................... 709/206
See application file for complete search history.

(56) References Cited

OTHER PUBLICATIONS

International Search Report for PCT/JP2013/076611 dated Oct. 22, 2013 [PCT/ISA/210].

* cited by examiner

| N.O. | RECIPIENT | SENDER | EMAIL SUBSTANCE INFORMATION | DESIRED SEND CONDITION | COMBINATION PERMISSION FLAG | EMAIL SUBSTANCE ANALYSIS INFORMATION |
|---|---|---|---|---|---|---|
| 0001 | 12345 | 54321 | ... | 2013/9/1 18:00:00 | 1 | ... |
| 0002 | 23456 | 54321 | ... | 2013/9/1 18:00:00 | 1 | ... |
| 0003 | 12345 | 65432 | ... | 2013/9/1 18:00:00 | 0 | ... |
| ... | ... | ... | ... | ... | ... | ... |

FIG.3

| USER ID | PURCHASED ITEM ID | PURCHASE TIME | OPERATION INFORMATION | EMAIL SENT TIME |
|---|---|---|---|---|
| 11111 | c-123 | 2013/8/7 21:00:00 | ... | 2013/8/7 18:00:00 |
| 22222 | p-500 | 2013/8/9 22:00:00 | ... | 2013/8/8 18:00:00 |
| ... | | ... | | ... |

FIG.4

| USER ID | RECIPIENT | EMAIL SUBSTANCE INFORMATION | . . . |
|---|---|---|---|
| 11111 | abc@··· | . . . | |
| 22222 | cbb@··· | . . . | |
| ... | ... | ... | |

FIG.7

```
<html>
<head>
· · · · · · · · · · · · · · · · · ·
</head>
<body>
<a href="ABCD.html">○○○SALE</a>
· · · · · ·
· · · · · ·
· · · · · · · · · · · · · · · · · ·
<a href="DCBA.html">△CAMERA NEW RELEASE</a> · · ·
<categ1>HOME APPLIANCES & PC</categ1>    <categ2>CAMERAS</categ2>
<categ3>DIGITAL CAMERAS</categ3>    <categ4>COMPANY A</categ4>
<ITEM ID>c-123</ITEM ID>
· · · · · ·
PRICE¥15,000 · · · POINT○% FREE SHIPPING · ·
WEIGHT : 500g · · · · PIXELS : 10 MEGA PIXELS · · ·
· · · · · [ZOOM : 10X] · · · ·
· · · · · · · · · · · · · · ·
· · · · · · · · · · · · · · ·
</body>
</html>
```

FIG.11

| EMAIL SUBSTANCE ANALYSIS INFORMATION | | | | | | |
|---|---|---|---|---|---|---|
| FIRST COMPONENT | SECOND COMPONENT | THIRD COMPONENT | FOURTH COMPONENT | ... | N-TH COMPONENT | |
| ○○○SALE | △CAMERAS NEW RELEASE | HOME APPLIANCES & PC | CAMERAS | ... | ... | |
| ▽△ BARGAIN | HOME APPLIANCES & PC | PC | LAPTOP PC | ... | ○○○SALE | |
| ... | | | | | | ... |

FIG.12

```html
<html>
<head>
. . . . . . . . . . . . . . . . . . . . . . . . .
. . . . . . . . . . . . . . . . . . . . . . . . .
</head>
<body>
<a href="ABCD.html">○○○SALE</a>
. . . . . . .
. . . . . . .
. . . . . . . . . . . . . .
<a href="DCBA.html">△△△CAMERA NEW RELEASE/a> ・・・
<categ1>HOME APPLIANCES & PC</categ1>   <categ2>CAMERAS</categ2>
<categ3>DIGITAL CAMERAS</categ3>   <categ4>COMPANY A</categ4>
<ITEM ID> : c-123</ITEM ID>
. . . . . . .
PRICE¥15,000  ・・・POINT○%  FREE SHIPPING・・
WEIGHT : 500g   ・・・・  PIXELS : 10 MEGA PIXELS  ・・・・
・・・・・[ZOOM : 10X]・・・・
. . . . . . . . . . . . . .
. . . . . . . . . . . . . .

<a href="EFGH.html">▽△BARGAIN/a>・・・
<categ1>HOME APPLIANCES & PC</categ1>   <categ2>PC</categ2>
<categ3>LAPTOP PC</categ3>   <categ4>COMPANY B</categ4>
<ITEM ID> : p-500</ITEM ID>
. . . . . . .
PRICE¥35,000・・・POINT▽%
  ・・ SHIPPING FEE¥○○
 ・・・・ [MEMORY CAPACITY: 4G] HDD CAPACITY: 500G・・
SCREEN SIZE 13inch・・・・・WEIGHT:2400g・・・・・
. . . . . . . . . . . . . .
. . . . . . . . . . . . . .
</body>
</html>
```

FIG.14

EMAIL GENERATION DEVICE, EMAIL GENERATION METHOD, PROGRAM FOR EMAIL GENERATION DEVICE, AND STORAGE MEDIUM

CROSS REFERENCE TO RELATED APPLICATIONS

This application is a National Stage of International Application No. PCT/JP2013/076611, filed on Sep. 30, 2013, the contents of all of which are incorporated herein by reference in their entirety.

TECHNICAL FIELD

The present invention relates to techniques for an email generation device that generates emails, an email generation method, a program for the email generation device, and a storage medium.

BACKGROUND ART

There are services that send users emails, such as magazines by email. The amount of data sent by email has increased. For this reason, there have been cases where the amount of data that recipient users receive is reduced. For example, Patent Literature 1 discloses an information transmission method that automatically inserts an identification code in header information of divided emails with an attached image file separately from a user operation in order to transfer the emails to a relay server. The relay server integrates the divided emails, adds a URL storing the attached file to a notification mail, and then sends it. This allows backward compatibility and compatibility between various models.

CITATION LIST

Patent Literature

Patent Literature 1: JP 2001-216214 A

SUMMARY OF INVENTION

Technical Problem

In Patent Literature 1, data is divided. However, in some cases, all the data is received in response to a user operation, and thus the total amount of the data is not reduced. Moreover, it requires an action to open the URL and the user cannot read the message of the email at a glance. Such an email is less effective, for example, in providing noticeability of information.

In view of such a problem, it is an object of the present invention to provide, for example, an email generation device that is capable of reducing the data amount of emails to be sent to a user while maintaining the effectiveness of the emails.

Solution to Problem

To solve the above problem, an embodiment disclosed herein, includes send candidate information storage means, extracting means, and email substance generating means. The send candidate information storage means stores a plurality of pieces of send candidate information. Each piece of send candidate information has recipient identification information identifying a recipient of an email and an email substance that are associated with each other. The email substance includes a plurality of components. From among the stored pieces of send candidate information, the extracting means extracts two or more pieces of send candidate information that have the same recipient identification information and at least one of the components related between email substances thereof. Email substance generating means generates an email substance to be sent to the recipient, based on common components related between the email substances of the extracted pieces of send candidate information and on components that are included in the email substances of the extracted pieces of send candidate information and that are other than the common components.

Thus, what includes the non-common components with the common component can reduce its email data amount by the common component and also reduce the number of emails to be sent, as compared with a plurality of pieces of email substance information before being combined, which are each sent, accordingly reducing the data amount of emails to be sent to a user while maintaining the effectiveness of the emails sent to the user.

In an embodiment disclosed herein, the email generation device in which when the information amount of the email substance generated by the email substance generating means is greater than or equal to a first threshold value, the extracting means further extracts, from among the extracted pieces of send candidate information, two or more pieces of second send candidate information that each have at least one of the components that is other than the common components and related between email substances thereof. The email substance generating means generates an email substance to the recipient, based on second common components related between the email substances of at least some of the extracted pieces of second send candidate information and on components that are included in the email substances of the extracted pieces of second send candidate information and that are other than the second common components.

In this case, the length of the emails sent to the user and being displayed on a display unit and the information amount of the emails being displayed on the display unit can be prevented from increasing, and the burden of reading all the sent emails on the user can be prevented from increasing. Consequently, the effectiveness of the emails can be maintained.

In an embodiment disclosed herein, the email generation device in which when the total number of components of all email substances included in two or more pieces of send candidate information extracted by the extracting means is greater than or equal to a second threshold value, the extracting means further extracts, from among the extracted pieces of send candidate information, two or more pieces of second send candidate information that each have at least one of the components that is different from the common components and related between email substances thereof. The email substance generating means generates an email substance to the recipient, based on second common components related between the email substances of at least some of the extracted pieces of second send candidate information and on components that are included in the email substances of the extracted pieces of second send candidate information and that are other than the second common components.

In this case, the length of the emails sent to the user and being displayed on the display unit and the information amount of the emails being displayed on the display unit can be prevented from increasing, and the burden of reading all the sent emails on the user can be prevented from increasing. Consequently, the effectiveness of the emails can be maintained.

In an embodiment disclosed herein, is the email generation device in which when the total number of components of all email substances included in two or more pieces of send candidate information extracted by the extracting means, which is obtained by counting common components as one component and by counting each component other than the common components as one component, among components of email substances included in the two or more extracted pieces of send candidate information, is greater than or equal to a third threshold value, the extracting means further extracts, from among the extracted pieces of send candidate information, two or more pieces of second send candidate information that each have at least one of the components that is different from the common components and related between email substances thereof.

In this case, the length of the emails sent to the user and being displayed on the display unit and the information amount of the emails being displayed on the display unit can be prevented from increasing, and the burden of reading all the sent emails on the user can be prevented from increasing. Consequently, the effectiveness of the emails can be maintained.

In an embodiment disclosed herein, is the email generation device in which the send candidate information storage means further stores a sent time at which an email including the send candidate information was sent to the recipient identification information. Two or more emails that have both the same recipient identification information and the same category to which an item corresponding to item identification information belongs and whose difference between the sent time and the current time is less than or equal to a fourth threshold value are extracted. At least one of the first, second, and third threshold values is set based on components in the email substance of an email that was handled by a user corresponding to the recipient identification information and on components in the email substance of an email that was not handled by the user, among the extracted emails.

In this case, an appropriate data amount of email can be generated based on, for example, user characteristics.

In an embodiment disclosed herein, in which when the number of pieces of send candidate information that are stored in the send candidate information storage means and that correspond to the recipient identification information is greater than or equal to a fifth threshold value, the extracting means extracts, from among the stored pieces of send candidate information, two or more pieces of send candidate information that have the same recipient identification information and at least one of the components related between email substances thereof. The fifth threshold value is set based on an elapsed time since a previous sent time corresponding to the recipient identification information.

In this case, when the need to reduce the amount of data to be sent is low, for example, when the total number of emails to be sent or the number of emails to be sent to each user is small, a process for combining emails is skipped and thus the processing load can be reduced. When the need to reduce the amount of data to be sent is high, for example, when the total number of emails to be sent or the number of emails to be sent to each user is large, the amount of data to be sent can be reduced. In addition, the fifth threshold value can be dynamically changed based on the elapsed time, and thus whether it is possible to combine a plurality of emails can be controlled based on the frequency of occurrence of send candidate information.

In an embodiment disclosed herien, the email generation device in which when the number of pieces of send candidate information that are stored in the send candidate information storage means and that correspond to the recipient identification information is greater than or equal to a sixth threshold value, the extracting means extracts, from among the stored pieces of send candidate information, two or more pieces of send candidate information that have the same recipient identification information and at least one of the components related between email substances thereof. The sixth threshold value is set based on a traffic on a communication line for sending the email.

In this case, the data amount of emails to be sent to a user can be reduced based on the traffic on the communication line.

An embodiment disclosed herein, includes the following steps. Send candidate information storage means stores a plurality of pieces of send candidate information. Each piece of send candidate information has recipient identification information identifying a recipient of an email and an email substance that are associated with each other. The email substance includes a plurality of components. From among the stored pieces of send candidate information, extracting means extracts two or more pieces of send candidate information. The two or more pieces of send candidate information have the same recipient identification information and at least one of the components related between email substances thereof. Email substance generating means generates an email substance to be sent to the recipient, based on common components related between the email substances of the extracted pieces of send candidate information and on components that are included in the email substances of the extracted pieces of send candidate information and that are other than the common components.

An embodiment dislosed herein, causes a computer to function as send candidate information storage means, extracting means, and email substance generating means. The send candidate information storage means stores a plurality of pieces of send candidate information. Each piece of send candidate information has recipient identification information identifying a recipient of an email and an email substance that are associated with each other. The email substance includes a plurality of components. From among the stored pieces of send candidate information, the extracting means extracts two or more pieces of send candidate information that have the same recipient identification information and at least one of the components related between email substances thereof. The email substance generating means generates an email substance to be sent to the recipient, based on common components related between the email substances of the extracted pieces of send candidate information and on components that are included in the email substances of the extracted pieces of send candidate information and that are other than the common components.

In an embodiment disclosed herein, a program for an email generation device is stored in a computer-readable format. The program causes a computer to function as send candidate information storage means, extracting means, and email substance generating means. The send candidate information storage means stores a plurality of pieces of send candidate information. Each piece of send candidate information has recipient identification information identifying a recipient of an email and an email substance that are associated with each other. The email substance includes a plurality of components. From among the stored pieces of send candidate information, the extracting means extracts two or more pieces of send candidate information that have the same recipient identification information and at least one of the components related between email substances thereof. The email substance generating means generates an email substance to be sent to the recipient, based on common components related between the email substances of the extracted pieces of send candidate information and on components that are included in the email substances of the extracted pieces of send candidate information that are other than the common components.

Advantageous Effects of Invention

The present invention makes it possible to reduce the data amount of emails to be sent to a user while maintaining the effectiveness of the emails.

BRIEF DESCRIPTION OF DRAWINGS

FIG. 3 is a schematic diagram showing an example of data stored in an email information database in FIG. 2.

FIG. 4 is a schematic diagram showing an example of history information.

FIG. 7 is a schematic diagram showing an example of a send list that a store makes to register emails.

FIG. 11 is a schematic diagram showing an example of email substance information.

FIG. 12 is a schematic diagram showing an example of email substance analysis information.

FIG. 14 is a schematic diagram showing an example of generated email substance information.

DESCRIPTION OF EMBODIMENTS

The following describes an embodiment of the present invention with reference to the drawings. In the embodiment described below, the present invention is applied to an email delivery system.

1. Configuration and Functional Overview of Email Delivery System

First, a configuration and a functional overview of an email delivery system according to an embodiment of the present invention is described with reference to FIG. 1.

Figure 1:
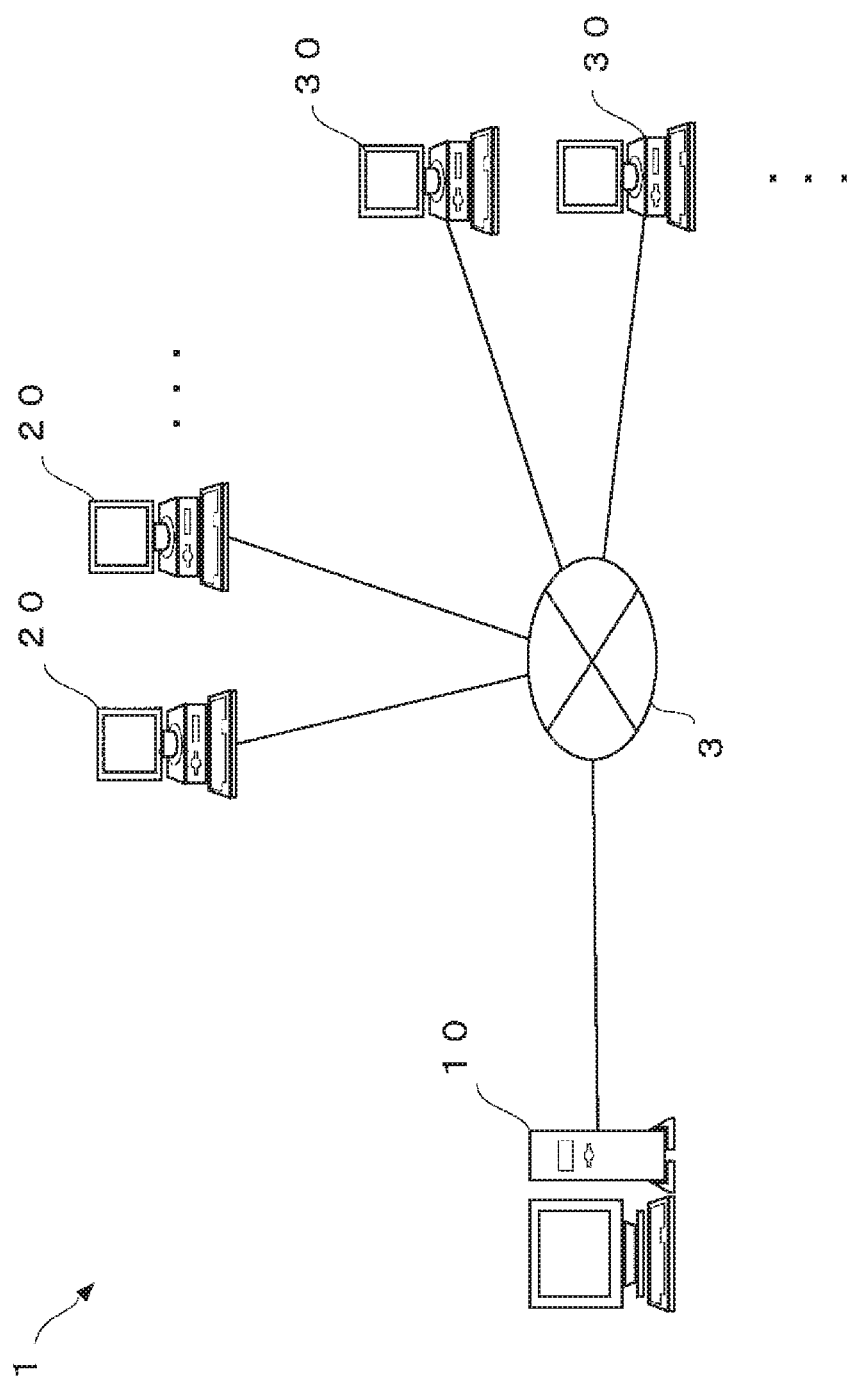
FIG. 1 is a schematic diagram schematically showing an example configuration of an email delivery system according to an embodiment of the present invention.

FIG. 1 is a schematic diagram schematically showing an example configuration of an email delivery system 1 according to this embodiment.

As shown in FIG. 1, the email delivery system 1 includes an information processing server 10 (an example of an email generation device), store terminal devices 20, and user terminal devices 30. The information processing server 10 is installed to operate a shopping site. Each of the store terminal devices 20 belongs to a store that provides the shopping site with items. Each of the user terminal devices 30 belongs to a user who shops on the shopping site.

The information processing server 10 is capable of exchanging data with each store terminal device 20 and each user terminal device 30 over a network 3 using communication protocols, such as TCP/IP. The network 3 includes, for example, the Internet, a dedicated communication line (e.g., community antenna television (CATV) line), a mobile communication network (including base stations), and a gateway.

The information processing server 10 is a computer of the shopping site that is an electronic mall.

Each store terminal device 20 is a computer of a tenant who provides the shopping site with items. The store terminal device 20 has a web browser function and displays, for example, a screen for receiving information about merchandise items. The tenant registers merchandise items and writes an email to be sent to an email address (an example of email recipient identification information) of a user of a user terminal device 30, using the store terminal device 20

Each user terminal device 30 is a computer of a user who purchases items on the shopping site. The user terminal device has a web browser function and displays an item search on its screen. The user terminal device 30 receives emails from the information processing server 10.

The email server (not shown) corresponding to each recipient is connected to the information processing server 10 and each user terminal device 30 via the network 3. The email server corresponding to each sender is the information processing server 10. Alternatively, it may be another email server for delivery.

2. Configuration and Functions of Information Processing Server and Each Terminal Device 2.1 Configuration and Functions of Information Processing Server 10

Figure 2:
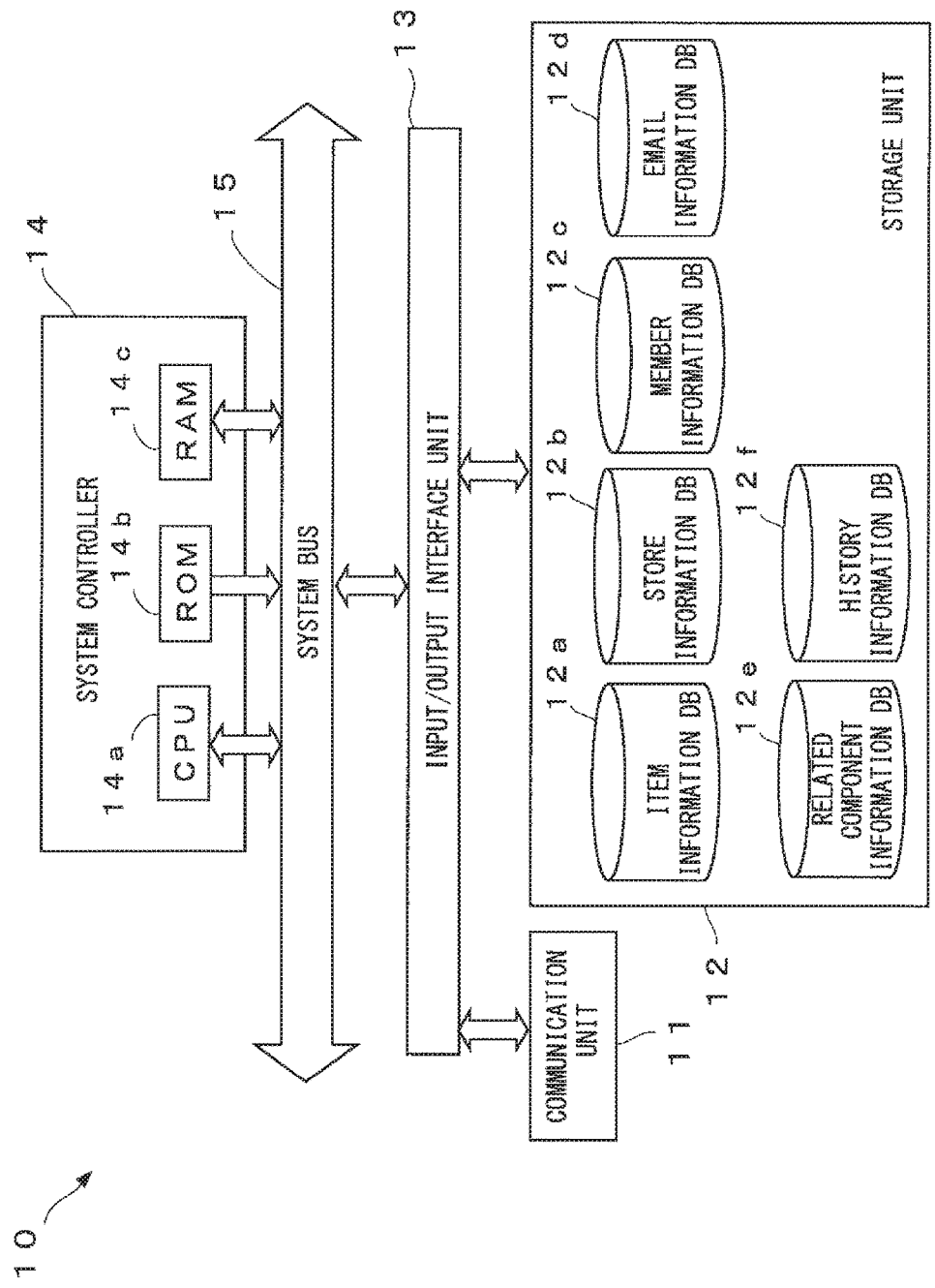
FIG. 2 is a block diagram schematically showing an example configuration of an information processing server in FIG. 1.

The following describes a configuration and functions of the information processing server 10 with reference to FIGS. 2 to 4.

FIG. 2 is a block diagram schematically showing an example configuration of the information processing server 10. FIG. 3 is a schematic diagram showing an example of data stored in an email information database. FIG. 4 is a schematic diagram showing an example of history information.

As shown in FIG. 2, the information processing server 10 includes a communication unit 11, a storage unit 12, an input/output interface unit 13, and a system controller 14. The system controller 14 and the input/output interface unit 13 are connected via a system bus 15.

The communication unit 11 connects to the network 3 and controls the state of communications with, for example, the store terminal devices 20 and the user terminal devices 30.

The storage unit 12 (an example of send candidate information storage means) includes, for example, hard disk drives. The storage unit 12 stores various programs, such as an operating system and server programs, and files including web pages written in a markup language, such as HTML. The various programs may be available from, for example, another server device over the network 3, or may be recorded in a recording medium and read via a drive device.

In the storage unit 12, an item information database 12a (hereinafter, simply an "item information DB 12a"), a store information database 12b (hereinafter, simply a "store information DB 12b"), a member information database 12c (hereinafter, simply a "member information DB 12c"), an email information database 12d (hereinafter, simply an "email information DB 12d"), a related component information database 12e (hereinafter, simply a "related component information DB 12e"), a history information database 12f (hereinafter, simply a "history information DB 12f"), and other databases are created.

The item information DB 12a stores information about items, such as item names, types, item images, specifications, and item introduction summaries, advertisement information, and other information.

The store information DB 12b stores store information, such as store IDs of stores, store descriptions, store names, addresses, telephone numbers, email addresses for the stores, and information about merchandise items. Each of the store IDs is an example of email sender identification information. Each of the email addresses is an example of the email sender identification information.

The member information DB 12c stores user information, such as user IDs of users who have signed up the shopping site (users of the shopping site), names, addresses, telephone numbers, email addresses, professions, hobbies, purchase histories, themes or genres that interest the users. The member information DB 12c also stores user IDs, login IDs, and passwords that are required to log in to the shopping site from the user terminal devices 30. Each login ID and the corresponding password are authentication information used in a login process (process for authenticating a user).

As shown in FIG. 3, the email information DB 12d, which is an example of the send candidate information storage means, stores recipients such as email addresses, senders such as store IDs, pieces of email substance information such as email messages, desired send conditions such as desired sent times at which the corresponding emails are to be sent, combination permission flags indicating whether to permit being combined with the messages of other emails, and pieces of email substance analysis information indicating analysis results of email substance information in association with each other as pieces of send candidate information. Each of the recipients is an example of the email recipient identification information. Each of the senders is an example of the email sender identification information. Each piece of email substance information is an example of an email substance including a plurality of components. Each piece of send candidate information is assigned a number. Each sender may be an email address for a store.

The email information DB 12d may further store, for example, sent times at which emails, such as emails previously sent, were sent when their scheduled sent time had come. That is, the email information DB 12d may store the sent time at which an email including send candidate information was sent to each piece of recipient identification information.

The email substance may be the email body portion of an email, the portion excluding the email header of an email to be sent, or email information including the email header. The email information (the email header and the email body portion) of an email to be sent as a packet-based communication and recipient identification information may be stored in association with each other. The email information is an example of the email substance. The email substance information indicates, for example, the portion specifically written in an HTML form in the email substance.

In the related component information DB 12e, a related component table that associates related components with each other is created. Also in the related component information DB 12e, for example, a synonym dictionary may be created. By referring to the related component information DB, a word included in a component can be replaced with a word having the same meaning.

As shown in FIG. 4, the history information DB 12f stores the item ID of a purchased item, a purchase time, operation information, an email sent time, and other information in association with each user ID. Examples of the operation information include which portion in an email was clicked, for example, user operation history information, such as a pointer trajectory or how much scrolling was performed, and the display position of clicked link information included in mail substance information.

As the operation information, the history information DB 12f also stores information about whether an email was handled by the user corresponding to recipient identification information, in association with, for example, the information identifying the recipient (user ID) and the email sent time.

Examples of the email that was handled include an email whose email substance was read, an email whose email substance includes a link that was clicked, an email whose email substance includes a link that was clicked and then caused the corresponding item to be purchased.

Moreover, this email is two or more emails that have both the same recipient identification information and the same category to which an item corresponding to item identification information belongs and whose difference between the current time and the sent time at which the email including the send candidate information was sent to the recipient identification information is less than or equal to a threshold value (an example of a fourth threshold value).

The information processing server 10 extracts two or more emails that have both the same recipient identification information and the same category to which the item corresponding to the item identification information belongs and whose difference between the sent time and the current time is less than or equal to the fourth threshold value, by referring to the email information DB 12d that stores information about emails previously sent.

2.2 Configuration and Functions of Store Terminal Device 20

Figure 5:
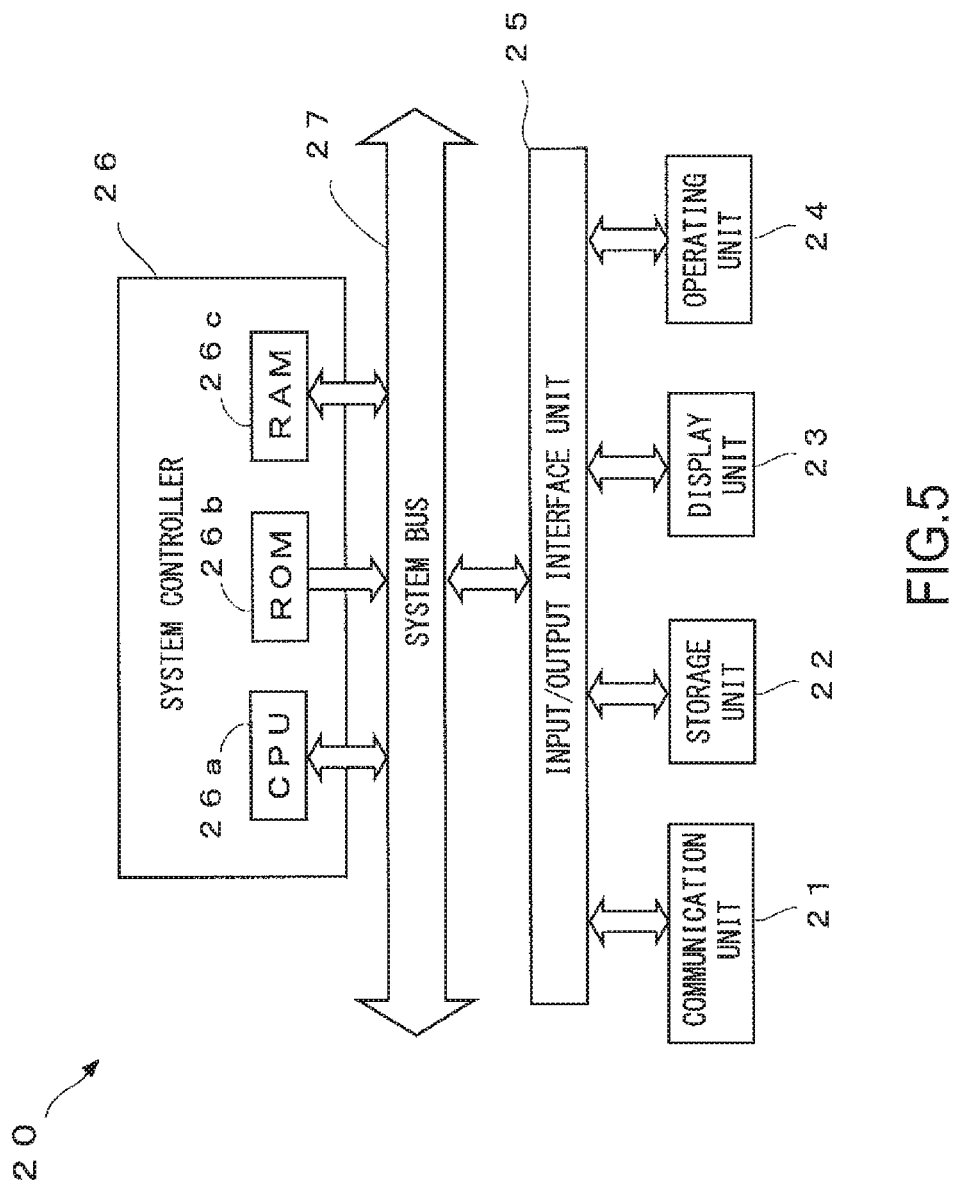
FIG. 5 is a block diagram schematically showing an example configuration of a store terminal device in FIG. 1.

The following describes a configuration and functions of the store terminal device 20 with reference to FIG. 5.

FIG. 5 is a block diagram schematically showing an example configuration of the store terminal device 20.

As shown in FIG. 5, the store terminal device 20 operates as a computer and is, for example, a personal computer, a wireless mobile phone including a smartphone, or a mobile terminal such as a PDA. The store terminal device 20 includes a communication unit 21, a storage unit 22, a display unit 23, an operating unit 24, an input/output interface unit 25, and a system controller 26. The system controller 26 and the input/output interface unit 25 are connected via a system bus 27.

The communication unit 21 controls the state of communications with, for example, the information processing server 10 over the network 3. When the store terminal device 20 is a mobile terminal device, the communication unit 21 has a wireless communication function to connect to a mobile communication network of the network 3.

The storage unit 22 includes, for example, hard disk drives. The storage unit 22 stores an operating system, a web browser program, a toolbar program for the web browser, and other programs.

The display unit 23 (an example of display means) includes, for example, liquid crystal display elements or electroluminescence (EL) devices. The web browser displays a web page for receiving information about an item on the display unit 23.

The operating unit 24 includes, for example, a keyboard and a mouse. A user enters a response via the operating unit 24. When the display unit 23 is touch switch type of display panel such as a touch screen, the operating unit 24 obtains information about which position in the display unit 23 the user touches or closely approaches.

The input/output interface unit 25 is an interface between the communication unit 21 and the storage unit 22, and the system controller 26.

The system controller 26 has, for example, a CPU 26a, a ROM 26b, and a RAM 26c. In the system controller 26, the CPU 26a reads and executes various programs stored in the ROM 26b, the RAM 26c, and the storage unit 22. For example, the system controller 26 executes the web browser program to function as the web browser.

2.3 Configuration and Functions of User Terminal Device 30

Figure 6:
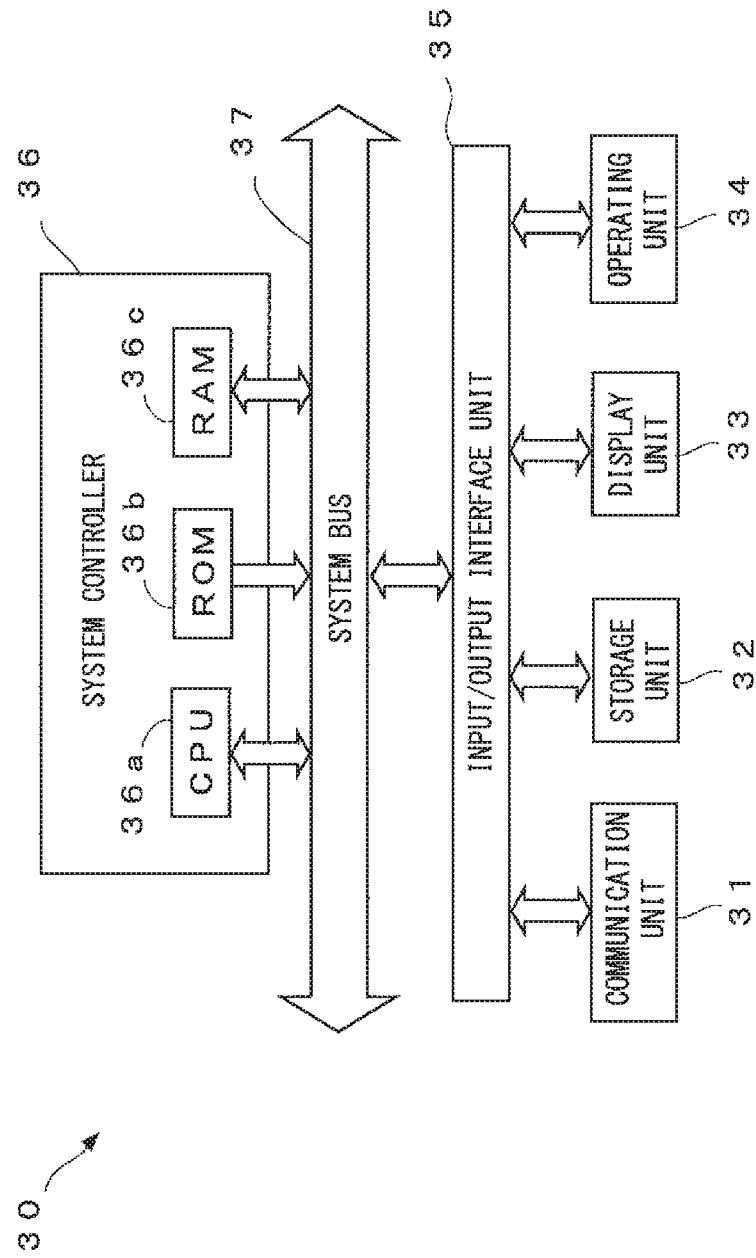
FIG. 6 is a block diagram schematically showing an example configuration of a user terminal device in FIG. 1.

The following describes a configuration and functions of the user terminal device 30 with reference to FIG. 6.

FIG. 6 is a block diagram schematically showing an example configuration of the user terminal device 30.

As shown in FIG. 6, as with store terminal device 20, the user terminal device 30 operates as a computer and is, for example, a personal computer, a wireless mobile phone including a smartphone, or a mobile terminal such as a PDA. The user terminal device 30 includes a communication unit 31, a storage unit 32, a display unit 33, an operating unit 34, an input/output interface unit 35, and a system controller 36. The system controller 36 and the input/output interface unit 35 are connected via a system bus 37. The configuration and the functions of the user terminal device 30 are approximately the same as the configuration and the functions of the store terminal device 20, and thus are not described in detail herein.

On the display unit 33, the email message of an email generated by the information processing server 10 is displayed based on information from the store terminal device 20.

3. How Email Delivery System Works

The following describes how the email delivery system 1 according to an embodiment of the present invention works with reference to the drawings.

3.1 Example of how Information Processing Server Receives Send List Information

First, an example of how the information processing server receives send list information is described with reference to FIGS. 7 to 9.

FIG. 7 is a schematic diagram showing an example of a send list that a store makes to register emails. FIG. 8 is a flowchart showing an example of how the information processing server 10 receives send list information. FIG. 9 is a schematic diagram showing an example of a send list reception screen displayed on the store terminal device 20.

First, when a send list is registered, as shown in FIG. 7, email addresses of users (customers) of user terminal devices and pieces of email substance information written in HTML or the like, and other information are entered using spreadsheet software on the store terminal device 20 and then stored in a send list file, for example, in a comma-separated values (CSV) form.

Instead of using the CSV file, the send list may be directly registered using, for example, a program or a tool on the Web. In each email substance information field in FIG. 7, information indicating a storage location where an HTML file as email substance information is stored may be entered. Based on this storage location, the corresponding email substance information may be uploaded to the information processing server 10 at the time of receipt of the send list file.

Subsequently, the store terminal device 20 requests a send list reception page to register send list information in the information processing server 10.

Figure 8:
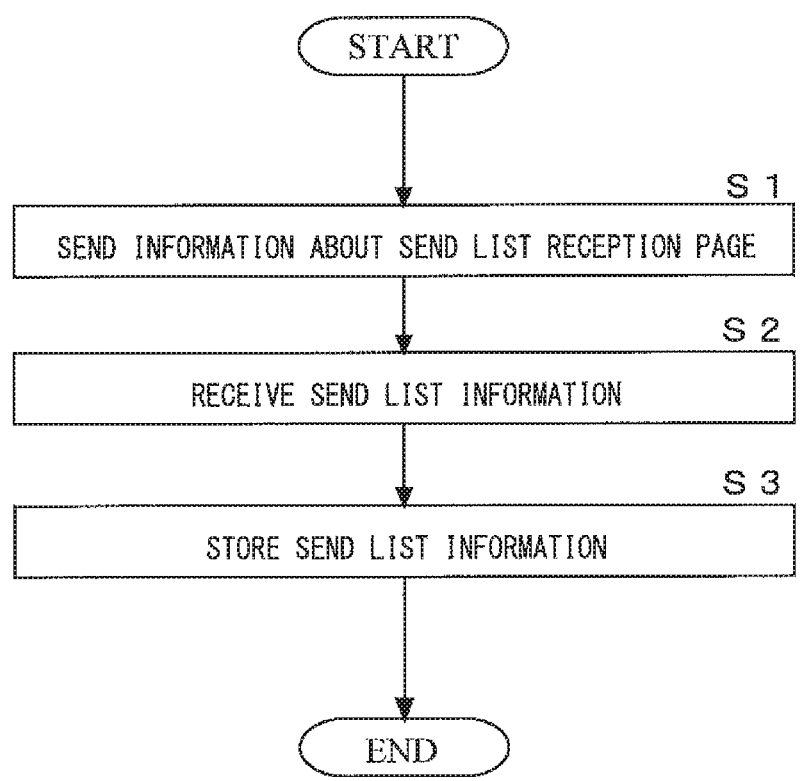
FIG. 8 is a flowchart showing an example of how the information processing server in FIG. 1 receives send list information.

Next, as shown in FIG. 8, the information processing server 10 sends information about the send list reception page (Step S1). Specifically, when a send list reception page request is received, the system controller 14 of the information processing server 10 sends the information about the send list reception page to the store terminal device 20 that has made the request.

Figure 9:
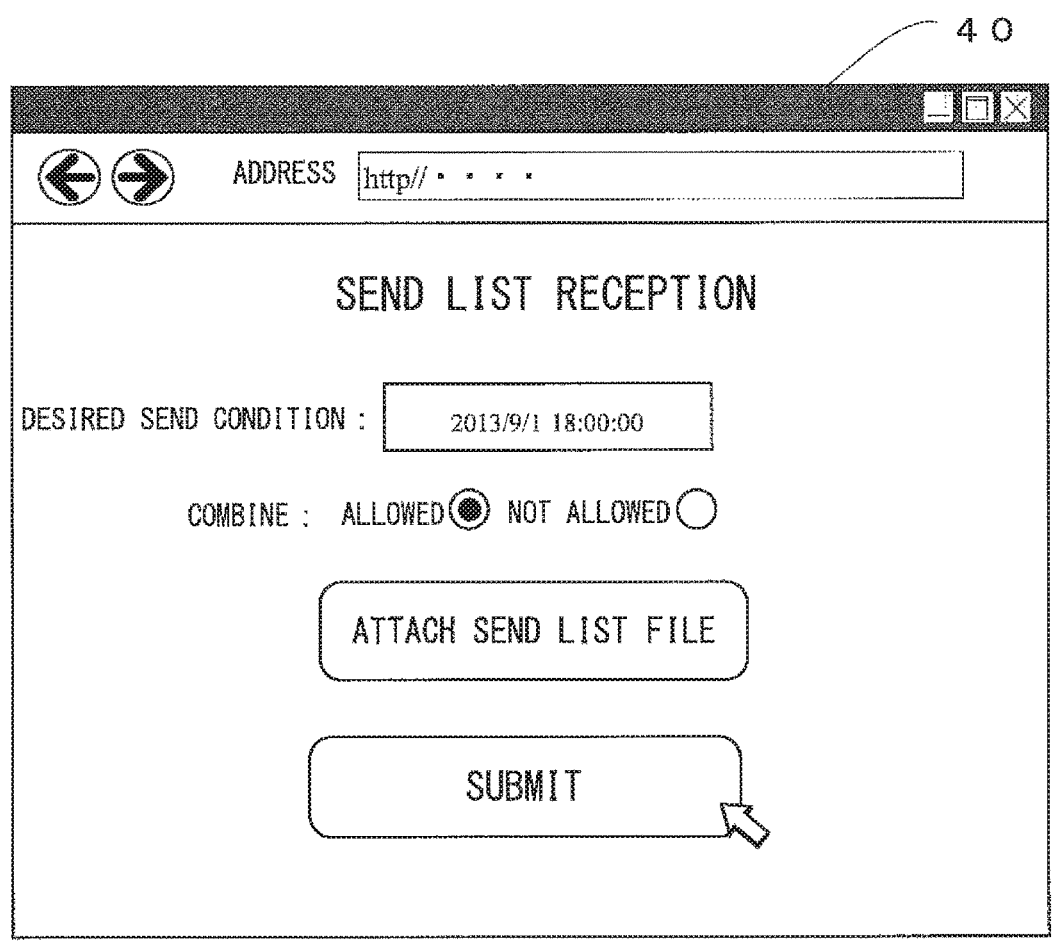
FIG. 9 is a schematic diagram showing an example of a send list reception screen displayed on the store terminal device in FIG. 1.

As shown in FIG. 9, the store terminal device 20 displays a send list reception page 40 on the display unit 23. Then, a store enters a desired send condition of the send list reception page 40 and sets a combination permission flag indicating whether to permit being combined with the messages of other emails. The desired send condition may be entered for each email when the send list is made.

Subsequently, an "attach send list file" button on the send list reception page 40 is pressed, and then the storage location of a send list file containing a send list is specified. When a "submit" button on the send list reception page 40 is selected after the send list file is specified, the store terminal device 20 sends the send list file with a store name and a store ID to the information processing server 10.

Next, the information processing server 10 receives the send list information from the store (Step S2). Specifically, the system controller 14 receives the send list file with the store name and the store ID from the store terminal device 20.

After that, the information processing server 10 stores the send list information as pieces send candidate information (Step S3). Specifically, as shown in FIG. 3, based on the received send list file, the system controller 14 stores recipients such as email addresses, senders, pieces of email substance information, desired send conditions, and combination permission flags, as the pieces send candidate information in the email information DB 12d.

Instead of sending the send list, the store terminal device 20 may send, with the pieces of email substance information, specification information specifying a customer segment, such as a desired age group and gender of customers, as a desired send condition to the information processing server 10, and the information processing server 10 may generate a send list. Alternatively, the store may specify, for example, an item in the message of an email (an item in email substance information), and the information processing server 10 may identify a customer segment that is likely to purchase the item in the message of the email from a database (e.g., the history information DB 12*f*) and generate a send list.

3.2 Example of how Information Processing Server Sends Email

The following describes an example of how the information processing server sends an email with reference to FIGS. 10 to 14.

Figure 10:
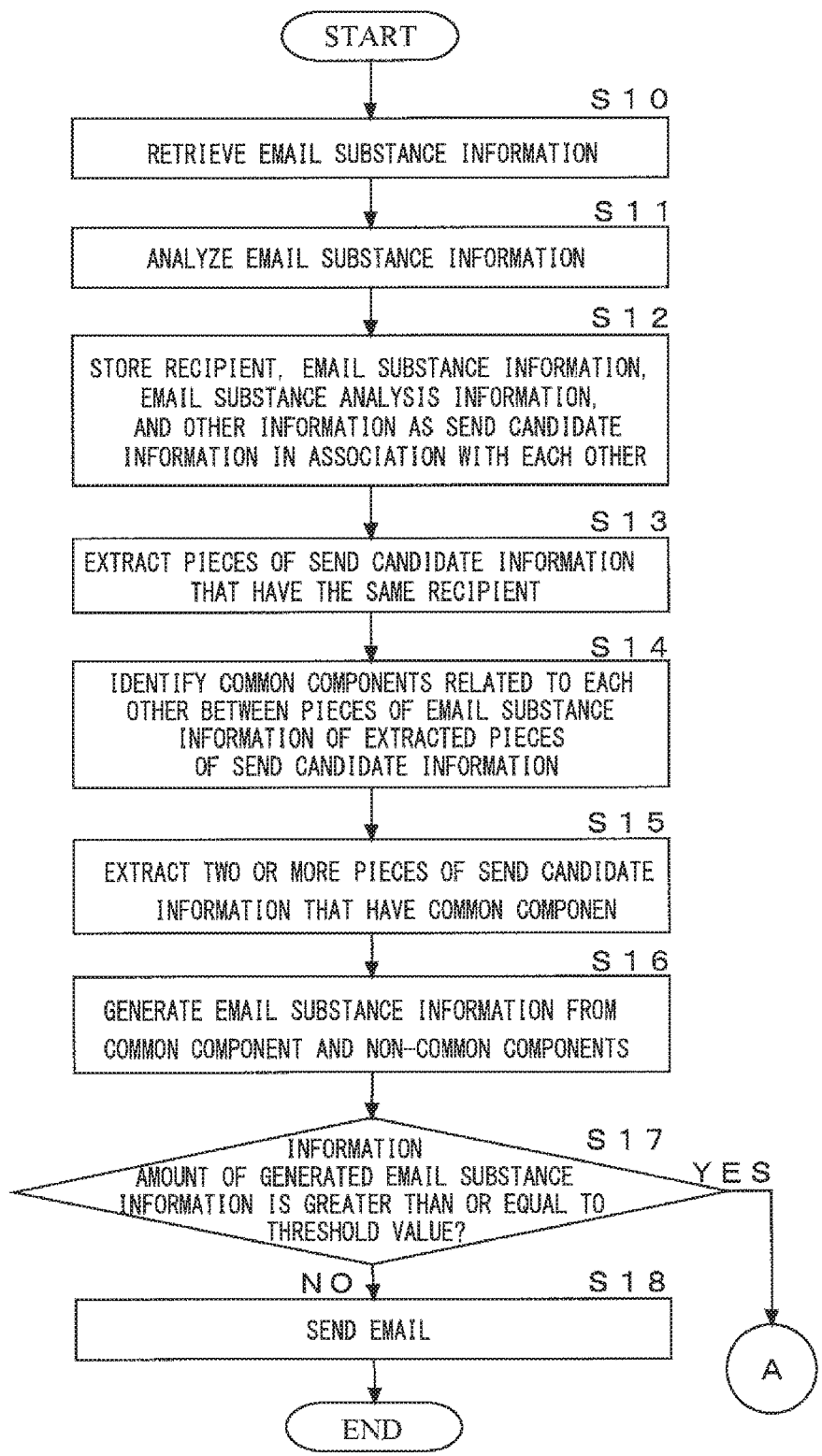
FIG. 10 is a flowchart showing an example of how the information processing server in FIG. 1 sends an email.
Figure 13:
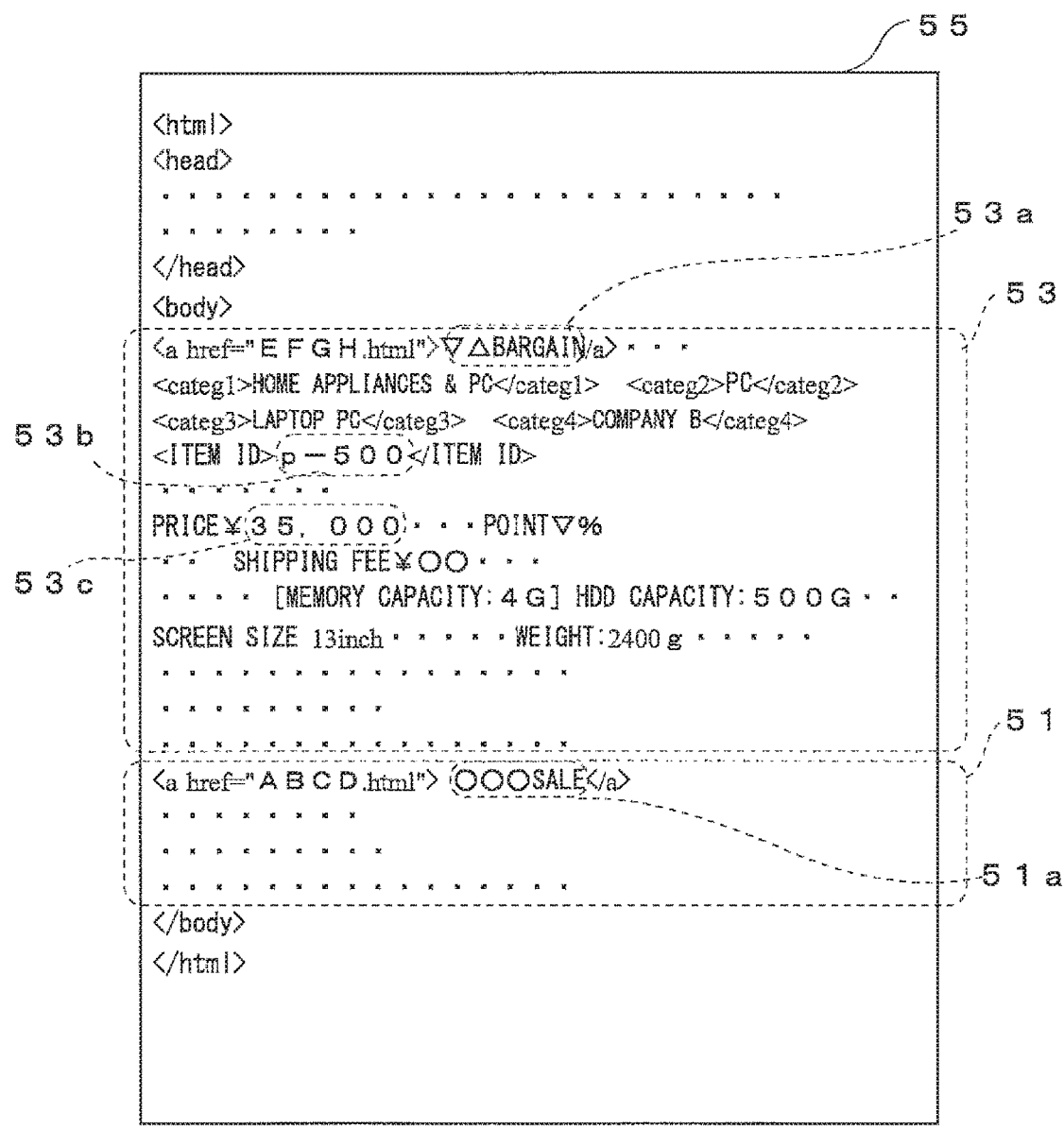
FIG. 13 is a schematic diagram showing an example of the email substance information.

FIG. 10 is a flowchart showing an example of how the information processing server 10 sends an email. FIGS. 11 and 13 are each a schematic diagram showing an example of email substance information. FIG. 12 is a schematic diagram showing an example of email substance analysis information. FIG. 14 is a schematic diagram showing an example of generated email substance information.

When a predetermined send condition is met, the information processing server 10 generates and sends an email. Examples of the predetermined send condition include that a desired sent time, which is a desired send condition included in the send list, has come, that a predetermined time, such as every other day or every other week, has come, and that the number of emails waiting to be sent (send candidate information) stored in the email information DB 12*d* exceeds a threshold value (an example of a fifth or sixth threshold value). The number of stored pieces of send candidate information may be the number of stored emails waiting to be sent for each recipient or the total number of emails waiting to be sent stored in the email information DB 12*d*.

The fifth threshold value is set based on the elapsed time since a sent time (e.g., the last sent time) at which an email was previously sent to recipient identification information (e.g., an email address), that is, the difference between the current time and a previous sent time. For example, the longer the elapsed time is, the higher the fifth threshold value is set. The shorter the elapsed time is, the lower the fifth threshold value is set. That is, the fifth threshold value is set so that email substances are more likely to be combined with each other when the elapsed time is short than when the elapsed time is long, even if the numbers of stored emails are the same. In other words, the fifth threshold value is set so that email substances are more likely to be combined with each other when the number of stored emails increases rapidly (when the rate of increase in the number of stored emails is high) than when the number of stored emails increases slowly (when the rate of increase in the number of stored emails is low), even if the number of stored emails are the same.

If the number of stored emails is less than the fifth threshold value when a desired sent time, which is a desired send condition included in the send list, has come, the information processing server 10 skips the following Steps S10 to S15 (a process for combining emails) and sends the corresponding email to the email address of the recipient without modification.

In this manner, the information processing server 10 functions as an example of setting means. When the number of pieces of send candidate information that are stored in the send candidate information storage means and that correspond to the recipient identification information is greater than or equal to the fifth threshold value, the setting means extracts, from among the stored pieces of send candidate information, two or more pieces of send candidate information that have the same recipient identification information and at least one of the components related between their email substances, and then sets the fifth threshold value based on the elapsed time since a previous sent time corresponding to the recipient identification information.

The sixth threshold value is set based on the traffic on a communication line (e.g., the network 3). For example, the sixth threshold value is set low during high traffic hours of the communication line and is set high during low traffic hours of the communication line. That is, the sixth threshold value is set so that email substances are more likely to be combined with each other during the high traffic hours of the communication line than during the low traffic hours of the communication line, even if the numbers of stored emails are the same. The traffic on the communication line may be estimated from the number of accesses or a change in the number of accesses to a predetermined site. While the number of accesses to the predetermined site is greater than or equal to a first reference value, the corresponding hours may be determined to be high traffic hours of the communication line. While the number of accesses to the predetermined site is less than or equal to a second reference value, which is less than the first reference value, the corresponding hours may be determined to be low traffic hours of the communication line.

In this manner, the information processing server 10 functions as an example of the setting means that sets the sixth threshold value based on the traffic on the communication line used for the sending means to send.

As shown in FIG. 10, the information processing server 10 retrieves email substance information (Step S10). Specifically, the system controller 14 of the information processing server retrieves, from the email information DB 12*d*, email substance information yet to be analyzed. As shown in FIG. 11, the email substance information is written in a markup language, such as HTML.

Subsequently, the information processing server 10 analyzes the email substance information (Step S11). Specifically, the system controller 14 of the information processing server 10 analyzes the email substance information from the beginning, based on tag information of the markup language, text description patterns, or the like. For example, portions sandwiched between each pair of tags, such as "<a>"

"</a>", "<categ1>" "</categ1>", and "<item ID>"
"</item ID>", are extracted as components 51*a*, 52*a*, and 52*b*.

Examples of the components 51*a* and 52*a* extracted based on the tags "<a href= . . . >" "</a>" include the component "OOO sale" and the component "Δ camera new release". Examples of the component 52*b* extracted based on the tags "<categ1>"

"</categ1>", "<item ID>" "</item ID>", or the like include the component "home appliances & PC" 52*b*, the component "camera" 52*b*, the component "digital camera" 52*b*, and the component "company A" 52*b*.

The tags indicate elements, instructions, or the like in a text written in HTML. For example, the tags "<categ1>"
"</categ1>" and the tags <item ID>" "</item ID>" are tags defined in an HTML header. The item ID is an example of item identification information.

The portion " . . . " in "<a href=>" . . . ">" may be extracted as a component. The tags "<categ1>""</categ1>", the tags "<categ2>" "</categ2>", the tags "<categ3>"

"</categ3>", and the tags "<categ4>" "</categ4>" are item categories, which are indicated in the order from a super-category to a sub-category.

As with <a bref= . . . ><span itemprop="title">home appliances & cameras</span></a>, item categories and item identification information may be extracted based on, for example, the tags "<a href= . . . ><span itemprop="title"> </span></a>". The information processing server 10 may determine whether word(s) indicating a category, such as "home appliances & cameras" or "cameras", are included in predetermined tags, such as the tags "<a href= . . . ><span itemprop="title"></span></a>", to extract item categories or item identification information.

When components of the email substance information in the send candidate information are extracted based on text description patterns, components 52c may be extracted based on the description pattern "Price ¥ . . . ", the description pattern "Point . . . %", the description pattern "Shipping Fee . . . ", the description pattern "Weight: . . . g", the description pattern "Pixels: . . . megapixels", the description pattern "[Zoom: . . . x]", and the like. Examples of such a component include the component "15,000", the component "0", the component "free", the component "500", the component "1000", and the component "10". Such description patterns may be prestored in a database. Alternatively, the description patterns may be generated by the technique disclosed in Japanese Patent Application No. 2012-501906.

Here, for example, there is a hierarchy in components of the email substance information in the send candidate information. A component 51 including the component 51a and a component 52 including the components 52a, 52b, and 52c are extracted. For example, based on the position of the component 52a, the email substance information is divided into the components 51 and 52, and then the components 51 and 52 are extracted. The superordinate components 51 and 52 may be generated from the subordinate components 51a, 52a, 52b, and 52c.

Subsequently, the information processing server 10 stores a recipient, the email substance information, email substance analysis information, and other information as send candidate information in association with each other (Step S12). As shown in FIG. 12, the system controller 14 sequentially stores the extracted components in the corresponding email substance analysis information field of the email information DB 12d. Information about the components 51 and 52 are also stored as the email substance analysis information in the email substance analysis information field of the email information DB 12d.

In this manner, the information processing server 10 functions as an example of the send candidate information storage means. The send candidate information storage means stores a plurality of pieces of send candidate information. Each piece of send candidate information has email recipient identification information and an email substance that are associated with each other. The email substance includes a plurality of components.

As shown in FIG. 13, Steps S10 to S12 are performed also for other email substance information 55 yet to be analyzed at this point. As shown in FIG. 13, the component 51a and components 53a, 53b, and 53c are extracted by the analysis. The component 51 and a component 53 are also extracted.

Steps S10 to S12 may be performed in advance when the send list is received in Step S2.

Subsequently, the information processing server 10 extracts pieces of send candidate information that have the same recipient (Step S13). Specifically, the system controller 14 extracts pieces of send candidate information that have the same recipient, by referring to the email information DB 12d.

Next, the information processing server 10 identifies common components related to each other between the pieces of email substance information of the extracted pieces of send candidate information (Step S14). Specifically, the system controller 14 identifies common components related to each other between the pieces of email substance information of the extracted pieces of send candidate information, by referring to the email information DB 12d and the related component information DB 12e. For example, the component "OOO sale" (the component 51) is a common component. The other components 52 and 53 are non-common components.

The related components are components that are identical or similar to each other between email substances. Some similar components include strings with similar meanings. Other similar components include strings with similar forms. The information processing server 10 identifies the related components by referring to the related component table of the related component information DB 12e. The pieces of send candidate information that have common components between their email substances are example pieces of send candidate information that have at least one component related between their email substances.

To identify a common component, for example, all the components included in the pieces of email substance information of all the pieces of send candidate information are extracted, and the frequency of appearance or the number of appearances of each component in all the extracted components is calculated. The component whose calculated frequency of appearance or calculated number of appearances is the greatest is identified as the common component. The component whose calculated frequency of appearance or calculated number of appearances is greater than or equal to a predetermined value (at least two) may be identified as the common component.

Each set of related components in the calculation is counted as the same component. For example, as a first counting method, the information processing server 10 replaces related components (e.g., A, A', or A") with one of the related components (A"→A, A'→A) by referring to the related component table (the related component information DB 12e), which defines correspondences between related components, and then makes a count. Alternatively, as a second counting method, the information processing server 10 converts related components (e.g., A, A', or A") into another new related component: A'" (or one component group: group A) by referring to the related component table, which defines correspondences between related components, and then makes a count. Alternatively, as a third counting method, the information processing server 10 may make a count without reflecting any relationship between components, and may then sum up related components while counting each set of related components as one component by the first counting method or the second counting method by referring to the related component table.

If two or more same components are extracted from one piece of send candidate information when all the components included in the pieces of email substance information of all pieces of the send candidate information are extracted, the information processing server 10 may be configured to delete the overlapping components to extract each component with no overlapping.

Subsequently, the information processing server 10 extracts two or more pieces of send candidate information that have the common component (Step S15). Specifically, the system controller 14 extracts two or more pieces of send candidate information that have the common component, by referring to the email information DB 12d. For example, pieces of send candidate information that have the common component "OOO sale" (component 51) are extracted.

In Steps S14 and S15, the system controller 14 may select one piece of send candidate information, search for send candidate information that has a component related to one component of this send candidate information, and extract two or more pieces of send candidate information that have the common components.

In this manner, the information processing server 10 functions as an example of extracting means. The extracting means extracts, from among the stored pieces of send candidate information, two or more pieces of send candidate information that have the same recipient identification information and at least one of the components related between their email substances.

Subsequently, the information processing server 10 generates email substance information from the common component and the non-common components (Step S16). For example, as shown in FIG. 14, the system controller 14 generates email substance information 56 by combining the component 51, which is the common component, and the components 52 and 53, which are the non-common components. That is, a new email is generated by combining an email that includes the component 51, which is the common component, and the component 52, which is a non-common component, and an email that includes the component 51, which is the common component, and the component 53, which is a non-common component.

In this manner, the information processing server 10 functions as an example of email substance generating means. The email substance generating means generates an email substance to be sent to the recipient, based on common components related between the email substances of the extracted pieces of send candidate information and on components that are included in the email substances of the extracted pieces of send candidate information and that are other than the common components.

Subsequently, the information processing server 10 determines whether the information amount of the generated email substance information is greater than or equal to a threshold value (an example of a first, second, or third threshold value) (Step S17). Specifically, the system controller 14 determines whether the information amount of the generated email substance information itself is greater than or equal to the threshold value. Examples of the information amount of the generated email substance information itself include the length of an email including the generated email substance information displayed on the display unit 33, the data amount of the generated email substance information itself (e.g., 1 MByte), and the number of components included in the generated email substance information itself (an example of the first threshold value, an example of the second threshold value, or an example of the third threshold value).

If the information amount of the generated email substance information is not greater than or equal to the threshold value (NO in Step S17), the information processing server 10 sends an email including the generated email substance information to the email address (an example of recipient identification information) of the recipient at the sent time that is the send condition (Step S18).

In this manner, the information processing server 10 functions as the sending means that sends the email substance generated by the email substance generating means to the recipient identification information.

If the information amount of the generated email substance information is greater than or equal to the threshold value (YES in Step S17), the information processing server 10 causes the process to proceed to Step S20 and subsequent steps that are an example of how to generate an email substance from a second common component.

3.3 Example of how to Generate Email Substance from Second Common Component, Etc.

The following describes an example of how to generate an email substance from, for example, a second common component with reference to FIGS. 15 to 18.

Figure 15:
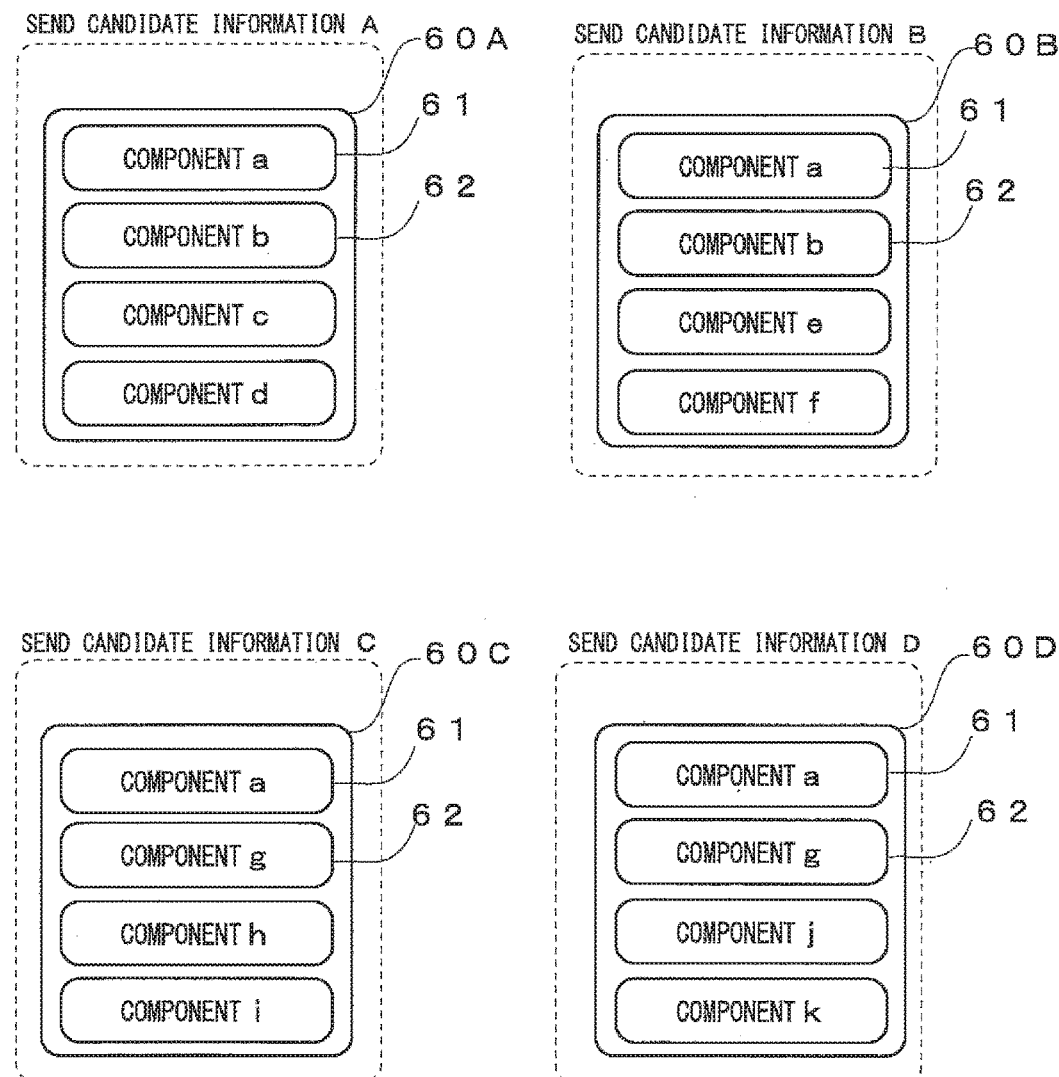
FIG. 15 is a schematic diagram showing an example of what constitutes the email substance information.
Figure 16:
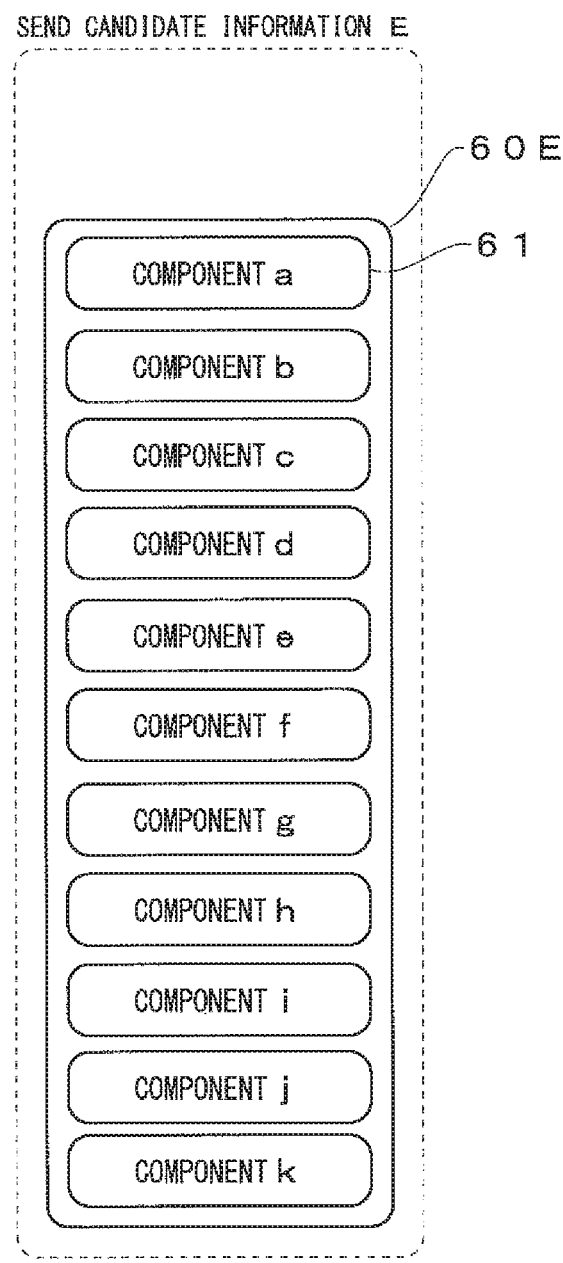
FIG. 16 is a schematic diagram showing an example of what constitutes the generated email substance information.
Figure 17:
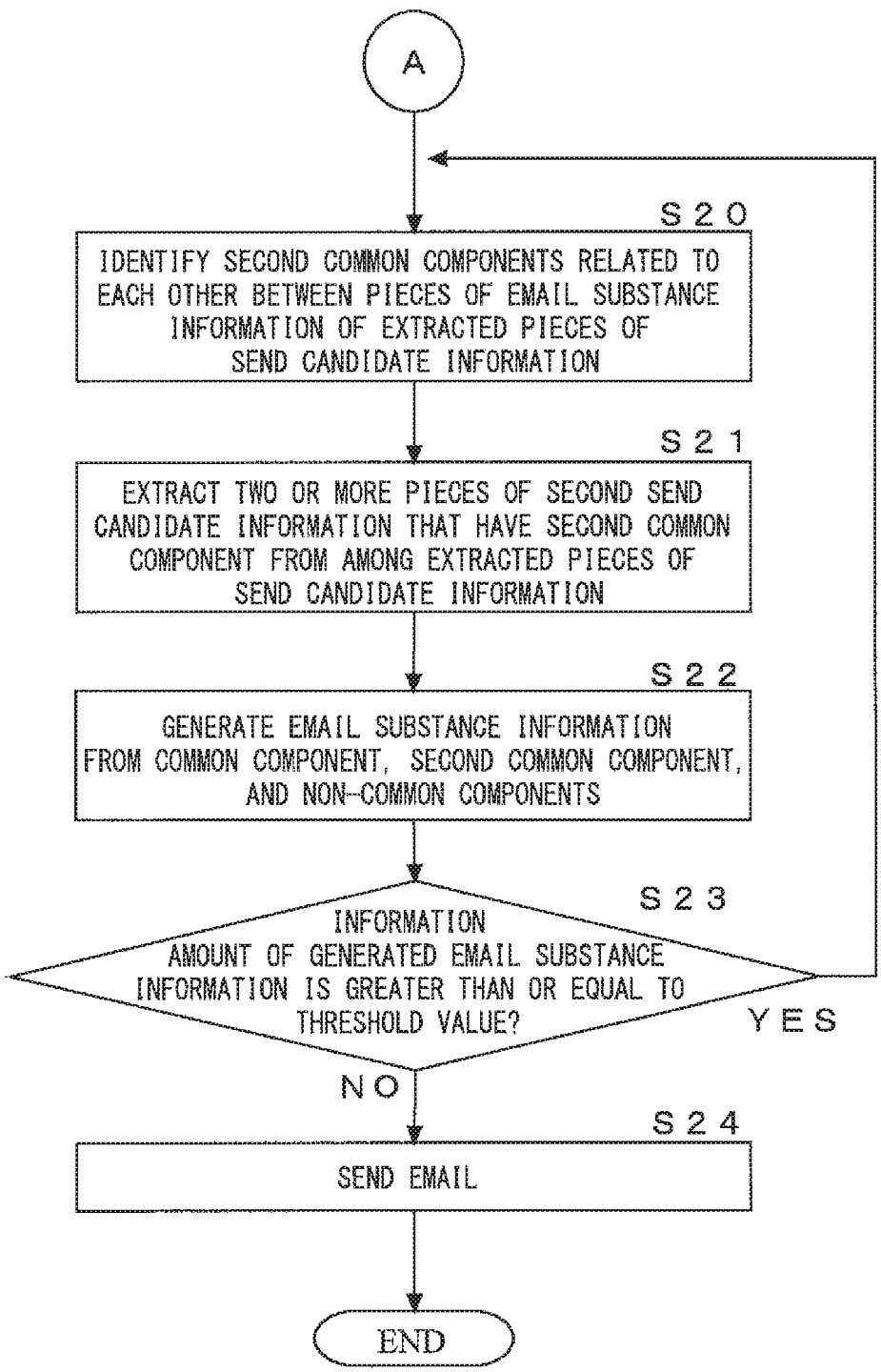
FIG. 17 is a flowchart showing an example of how to generate an email substance from, for example, a second common component.
Figure 18:
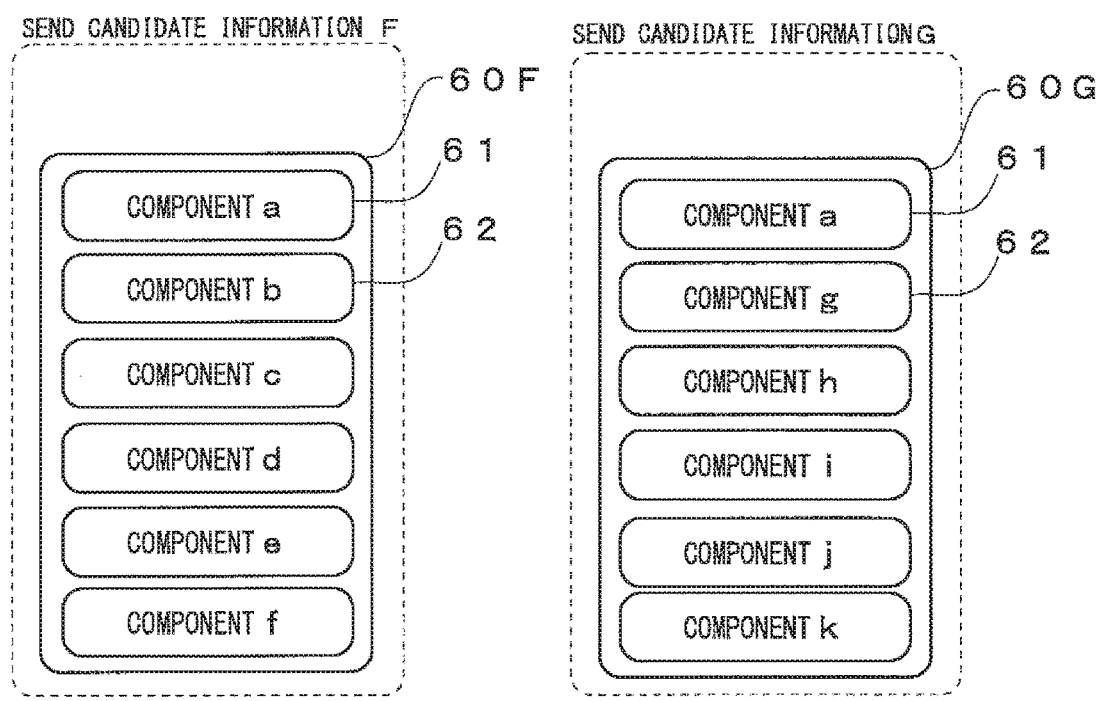
FIG. 18 is a schematic diagram showing an example of what constitutes the generated email substance information.

FIG. 15 is a schematic diagram showing an example of what constitutes the email substance information. FIGS. 16 and 18 are each a schematic diagram showing an example of what constitutes generated email substance information. FIG. 17 is a flowchart showing an example of how to generate an email substance from, for example, a second common component.

First, assume that pieces of send candidate information A, B, C, and D having a common component 61 (a component a) are extracted in Step S15, as shown in FIG. 15. The email substance information 60A of the send candidate information A has the component a, a component b, a component c, and a component d. The email substance information 60B of the send candidate information B has the component a, the component b, a component e, and a component f. The email substance information 60C of the send candidate information C has the component a, a component g, a component h, and a component i. The email substance information 60D of the send candidate information D has the component a, the component g, a component j, and a component k.

Here, assume that in all the email substance information of all the extracted pieces of send candidate information, the number of appearances of the component a is 4 or the frequency of appearance is 1 (pieces of send candidate information including the component a/all pieces of send candidate information to be compared: 4/4), the number of appearances of the component b is 2 or the frequency of appearance is 1/2 (pieces of send candidate information including the component b/all pieces of send candidate information to be compared: 2/4), and the number of appearances of the component g is 2 or the frequency of appearance is 1/2 (pieces of send candidate information including the component g/all pieces of send candidate information to be compared: 2/4).

As shown in FIG. 15, the total number of the components a to k, 11, is an example of the total number the components of all the email substances included in the two or more pieces of send candidate information extracted by the extracting means.

Subsequently, in Step S16, send candidate information E having combined email substance information 60 E generated from the common component 61 (the component a) of the send candidate information A, B, C, and D, and from the non-common components (the components b, c, d, e, f, g, h, and i) opposed to the common component 61, as shown in FIG. 16. Here, assume that the information amount of the email substance information of the send candidate information E is greater than or equal to the threshold value (YES in Step S17).

Subsequently, as shown in FIG. 17, the information processing server 10 identifies second common components (an example of second common components) related to each other between the pieces of email substance information of some of the extracted pieces of send candidate information (Step S20). For example, by referring to the email information DB 12d, the components b (components 62) and the components g (components 62), which are the second most frequent components, as second common components related to each other between the email substance information 60A, 60B, 60C, and 60D of the extracted send candidate information A, B, C, and D.

As shown in FIG. 18, the number of components, 6, in email substance information 60F and the number of components, 6, in email substance information 60G are each an example of the total number of components of all the email substances included in the two or more pieces of send candidate information extracted by the extracting means, which is obtained by counting the common components as one component and by counting each component other than the common components as one component, among the components of the email substances included in the two or more extracted pieces of send candidate information.

Subsequently, the information processing server 10 extracts two or more pieces of second send candidate information that have the second common components from among the extracted pieces of send candidate information (Step S21). Specifically, by referring to the email information DB 12d, the system controller 14 extracts the send candidate information A and B that have the second common components (the components b) as an example of the two or more pieces of second send candidate information that have related components other than the common components 61 (the components a). The system controller 14 also extracts the send candidate information C and D that have the second common components (the components g) as an example of the two or more pieces of second send candidate information that have related components other than the common components 61 (the components a).

In this manner, the information processing server 10 functions as an example of extracting means. The extracting means extracts, from among the stored pieces of send candidate information, two or more pieces of send candidate information that have the same recipient identification information and at least one of the components related between their email substances. The information processing server 10 also functions as an example of the extracting means. When the information amount of the email substance generated by the email substance generating means is greater than or equal to the first threshold value, the extracting means further extracts, from among the extracted pieces of send candidate information, two or more pieces of second send candidate information that each have at least one of the components that is other than the common components and related between their email substances.

In this manner, the information processing server 10 also functions as an example of the extracting means. When the total number of components of the email substance generated by the generating means is greater than or equal to the second threshold value, the extracting means further extracts, from among the extracted pieces of send candidate information, two or more pieces of second send candidate information that each have at least one of the components that is different from the common components and related between their email substances. The information processing server 10 also functions as another example of the extracting means. When the total number of components of all the email substances included in the two or more pieces of send candidate information extracted by the extracting means, which is obtained by counting the common components as one component and by counting each component other than the common components as one component, among the components of the email substances included in the two or more extracted pieces of send candidate information, is greater than or equal to the third threshold value, the extracting means further extracts, from among the extracted pieces of send candidate information, two or more pieces of second send candidate information that each have at least one of the components that is different from the common components and related between their email substances.

Subsequently, the information processing server 10 generates email substance information from the common component, the second common component, and the non-common components (Step S22). Specifically, as shown in FIG. 18, the system controller 14 generates the email substance information 60F to be sent to the recipient, based on the common components 61 (the components a) related between the email substance information 60A and 60B of the extracted send candidate information A and B (the second send candidate information), on the second common components 62 (the components b), and on the components (the components c, d, e, and f) that are included in the email substances of the extracted send candidate information A and B and that are other than the second send candidate information.

Also as shown in FIG. 18, the system controller 14 generates the email substance information 60G to be sent to the recipient, based on the common components 61 (the components a) related between the email substance information 60C and 60D of the extracted send candidate information C and D (the second send candidate information), on the second common components 62 (the components g), and on the components (the components h, i, j, and k) that are included in the email substances of the extracted send candidate information C and D and that are other than the second send candidate information.

In this manner, the information processing server 10 functions as an example of email substance generating means. The email substance generating means generates an email substance to be sent to the recipient, based on common components related between the email substances of the extracted pieces of send candidate information and on components that are included in the email substances of the extracted pieces of send candidate information and that are other than the common components. The information processing server 10 also functions as another example of the email substance generating means. The email substance generating means generates an email substance to be sent to the recipient, based on second common components related between the email substances of some of the extracted pieces of second send candidate information and on components that are included in the email substances of the extracted pieces of second send candidate information and that are other than the second common components.

Subsequently, the information processing server 10 determines whether the information amount of the generated email substance information is greater than or equal to the threshold value (an example of the first, second, or third threshold value) (Step S23). As in Step S17, the information processing server 10 determines whether the information amounts of the generated email substance information 60F and 60G are each greater than or equal to the threshold value.

If the information amount of the generated email substance information is not greater than or equal to the threshold value (NO in Step S23), the information processing server 10 sends emails of the send candidate information F and G to the email address of the recipient at the sent time that is the send condition (Step S24).

In this manner, the information processing server 10 functions as the sending means that sends the email substance generated by the email substance generating means to the recipient identification information.

If the information amount of the generated email substance information is greater than or equal to the threshold value (YES in Step S23), the information processing server 10 causes the process to return to Step S20. Then, the information processing server 10 further extracts a second common component in Step S21 to make the information amount of the generated email substance information less than the threshold value.

If the information amount of the email substance information generated using the component "OOO sale" (the component 51) as a common component is greater than or equal to the threshold value, the information processing server 10 may combine pieces of email substance information that have a component (a second common component) belonging to a common super-category that is extracted using the tags "<categ1>"
"</catecg1>".

As thus described, according to this embodiment, the email substance information 56 newly generated, which includes the common component 51 and the non-common components 52 and 53, can reduce its email data amount by the common component 51 and also reduce the number of emails to be sent, as compared with email substance information 50 and the email substance information 55 before being combined, which are each sent, accordingly reducing the data amount of emails to be sent to a user while maintaining the effectiveness of the emails sent to the user.

When the information amount of the generated email substance information 56 is greater than or equal to the first threshold value, the information processing server 10 further extracts, from among the extracted send candidate information A, B, C, and D, two or more pieces of second send candidate information A and B (or C and D) that each have at least one of the components that is other than the common components 61 and related between their email substance information 60A, 60B, 60C, and 60D. Then, the information processing server 10 generates an email substance to be sent to the recipient, based on the second common components 62 related between the email substances of at least some pieces of second send candidate information A and B (or C and D), among the extracted pieces of second send candidate information and on the components c, d, e and h (or the components h, i, j, and k) that are included in the email substance information 60A and 60B (60C and 60D) of the extracted second send candidate information A and B (or C and D) and that are other than the second common components.

In this case, the length of the emails sent to the user and being displayed on the display unit and the information amount of the emails being displayed on the display unit 33 can be prevented from increasing, and the burden of reading all the sent emails on the user can be prevented from increasing. Consequently, the effectiveness of the emails can be maintained.

When the total number of components (the components a to k) of the email substance generated by the generating means is greater than or equal to the second threshold value, the information processing server 10 further extracts, from among the extracted pieces of send candidate information, two or more pieces of second send candidate information A and B (or C and D) that each have at least one component that is different from the common components and related between their email substances. Then, the information processing server 10 generates an email substance to be sent to the recipient, based on the second common components 62 related between the email substances of at least some of second the extracted pieces of send candidate information and on the component c and the components d, e and h (or the components h, i, j, and k) that are included in the email substances 60A and 60B (60C and 60D) of the extracted second send candidate information A and B (or C and D) and that are other than the second common components.

In this case, the length of the emails sent to the user and being displayed on the display unit and the information amount of the emails being displayed on the display unit 33 can be prevented from increasing, and the burden of reading all the sent emails on the user can be prevented from increasing. Consequently, the effectiveness of the emails can be maintained.

When the total number of components a, b, c, d, e, and f, for the send candidate information F) of all the email substances included in the two or more extracted pieces of send candidate information F (G), which is obtained by counting the common components as one component and by counting each component other than the common components as one component, among the components of the email substance generated by the generating means, is greater than or equal to the third threshold value, the information processing server further extracts, from among the extracted pieces of send candidate information, two or more pieces of second send candidate information that each have at least one of the components that is different from the common components and related between their email substances.

In this case, the length of the emails sent to the user and being displayed on the display unit and the information amount of the emails being displayed on the display unit 33 can be prevented from increasing, and the burden of reading all the sent emails on the user can be prevented from increasing. Consequently, the effectiveness of the emails can be maintained.

When the number of pieces of send candidate information that are stored in the email information DB 12*d* and that correspond to recipient identification information is greater than or equal to the fifth threshold value, the information processing server 10 extracts, from among the stored pieces of send candidate information, two or more pieces of send candidate information that have the same recipient identification information and that have at least one component related between their email substances, and then sets the fifth threshold value based on the elapsed time since a previous sent time corresponding to the recipient identification information.

In this case, when the need to reduce the amount of data to be sent is low, for example, when the total number of emails to be sent or the number of emails to be sent to each user is small, a process for combining emails is skipped and thus the processing load can be reduced. When the need to reduce the amount of data to be sent is high, for example, when the total number of emails to be sent or the number of emails to be sent to each user is large, the amount of data to be sent can be reduced. In addition, the fifth threshold value can be dynamically changed based on the elapsed time, and thus combination of a plurality of emails can be appropriately controlled based on the frequency of occurrence of send candidate information.

When the number of pieces of send candidate information that are stored in the email information DB 12*d* and that correspond to recipient identification information is greater than or equal to the sixth threshold value, the information processing server 10 extracts, from among the stored pieces of send candidate information, two or more pieces of send candidate information that have the same recipient identification information and that have at least one of the components related between their email substances, and then sets the sixth threshold value based on the traffic on the communication line (the network 3) for sending emails.

In this case, the data amount of emails to be sent to a user can be reduced based on the traffic on the communication line.

Based on the operation history information of each recipient user (the history information DB 12f), the threshold value (an example of the first, second, or third threshold value) for the information amount of email substance information may be set. For example, if the display position of link information (an example of the component) clicked by a user who received an email with a relatively high amount of information is the display position farthest from the top display position or its initial display position in the email substance information, the information amount does not place the burden of reading all the email on the user, and thus the threshold value for the information amount may be set high.

Figure 19:
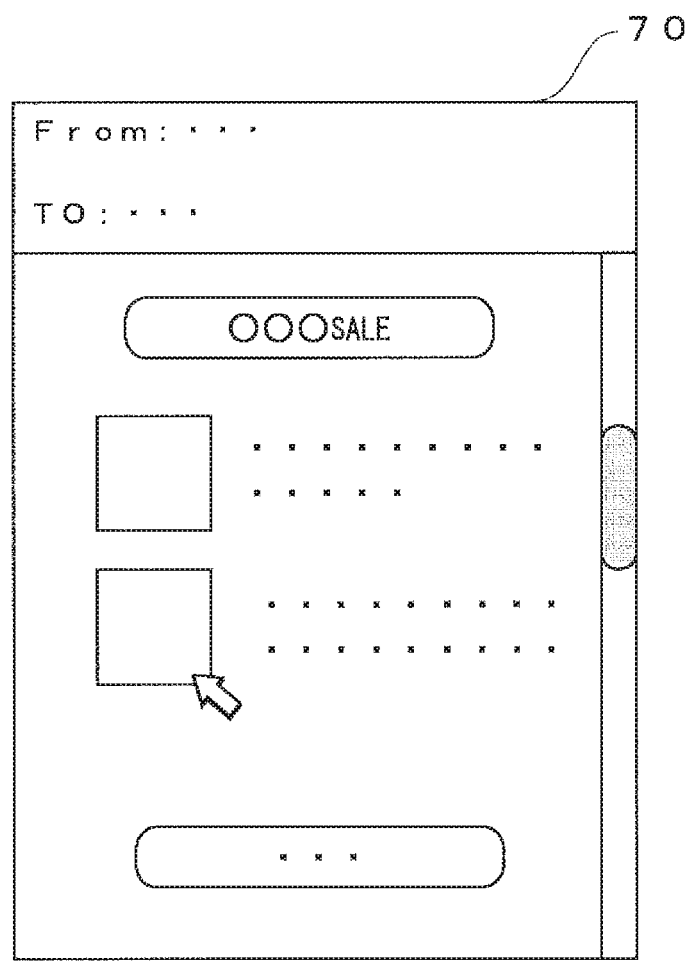
FIG. 19 is a schematic diagram showing an example operation on a sent email.

As shown in FIG. 19, the information processing server 10 obtains, from the user terminal device 30, which portion in a sent email 70 was clicked, for example, user operation history information, such as a pointer trajectory and how much scrolling was performed, or the display position of clicked link information included in mail substance information. The display position of the clicked link information in the email substance information may be identified based on request information from a user that is based on the link information and on the email substance information that is stored in the email information DB 12d and that corresponds to an email sent to the user.

The information processing server 10 sets the threshold value for the information amount of email substance information, based on, for example, a user operation history. For example, the information processing server 10 estimates what amount of email substance information is acceptable to average users, from a clicked position, a pointer trajectory, and a scrolling position in the email 70. Base on the estimated value, the information processing server 10 sets the threshold value.

In this case, an appropriate data amount of email can be generated based on, for example, user characteristics.

In this manner, the information processing server 10 functions as an example of the setting means. The setting means extracts two or more emails that have both the same recipient identification information and the same category to which an item corresponding to item identification information belongs and whose difference between the sent time and the current time is less than or equal to the fourth threshold value, and sets at least one of the first, second, and third threshold values, based on the components in the email substance of an email that was handled by the user corresponding to the recipient identification information and on the components in the email substance of an email that was not handled by the user, among the extracted emails.

In Steps S13 and S14, the information processing server identifies common components related between two or more email substance and extracts send candidates that have the same recipient and the common component. Alternatively, the information processing server 10 may select specific send candidate information and extract a common component related to a component of the selected send candidate information from among the other pieces of send candidate information stored in the email information DB 12d.

In this manner, the information processing server 10 functions as an example of extracting means. The extracting means extracts, from among the stored pieces of send candidate information, two or more pieces of send candidate information that have the same recipient identification information and at least one of the components related between their email substances.

Figure 20:
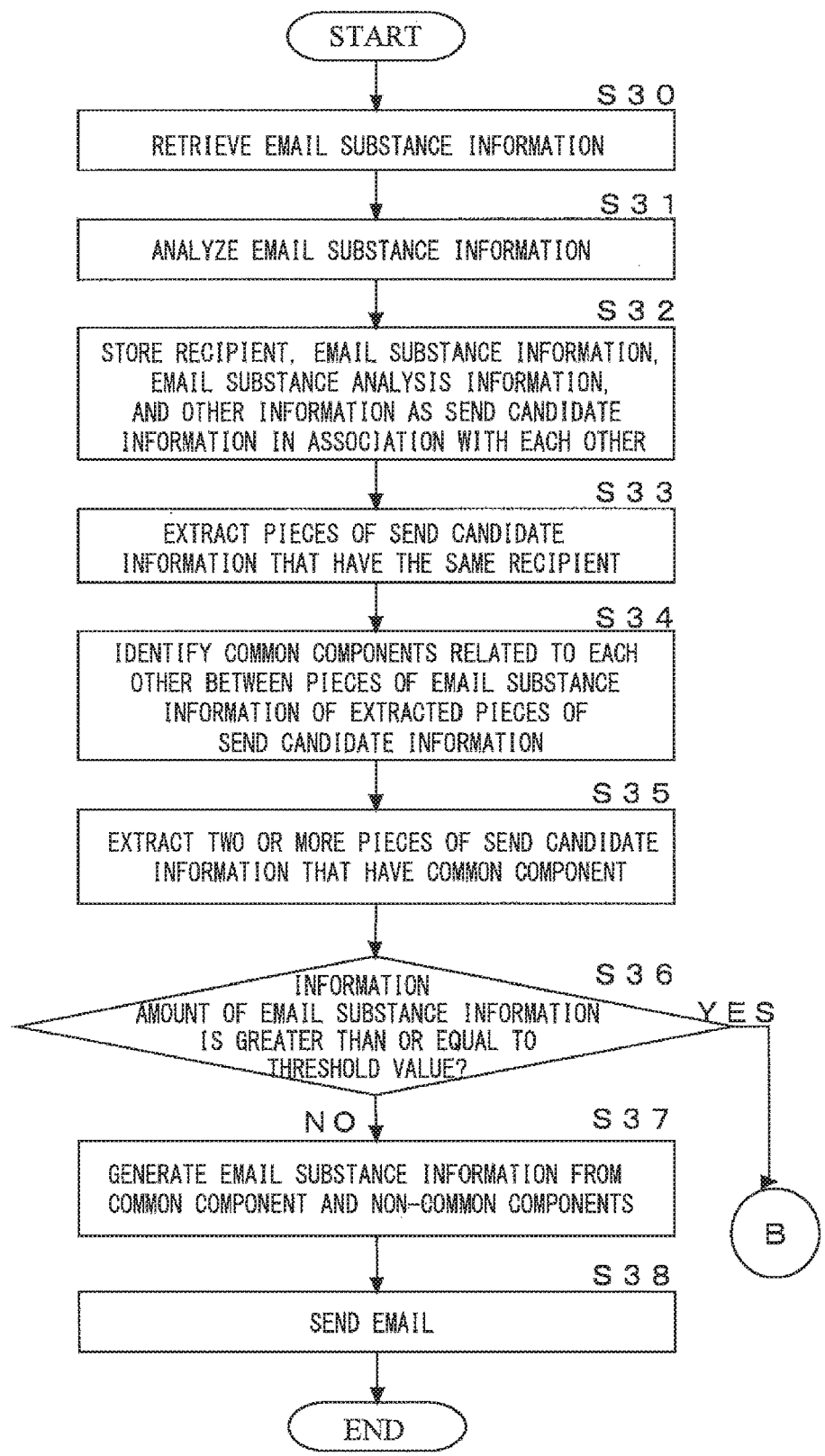
FIG. 20 is a flowchart showing a modification of how to send an email.
Figure 21:
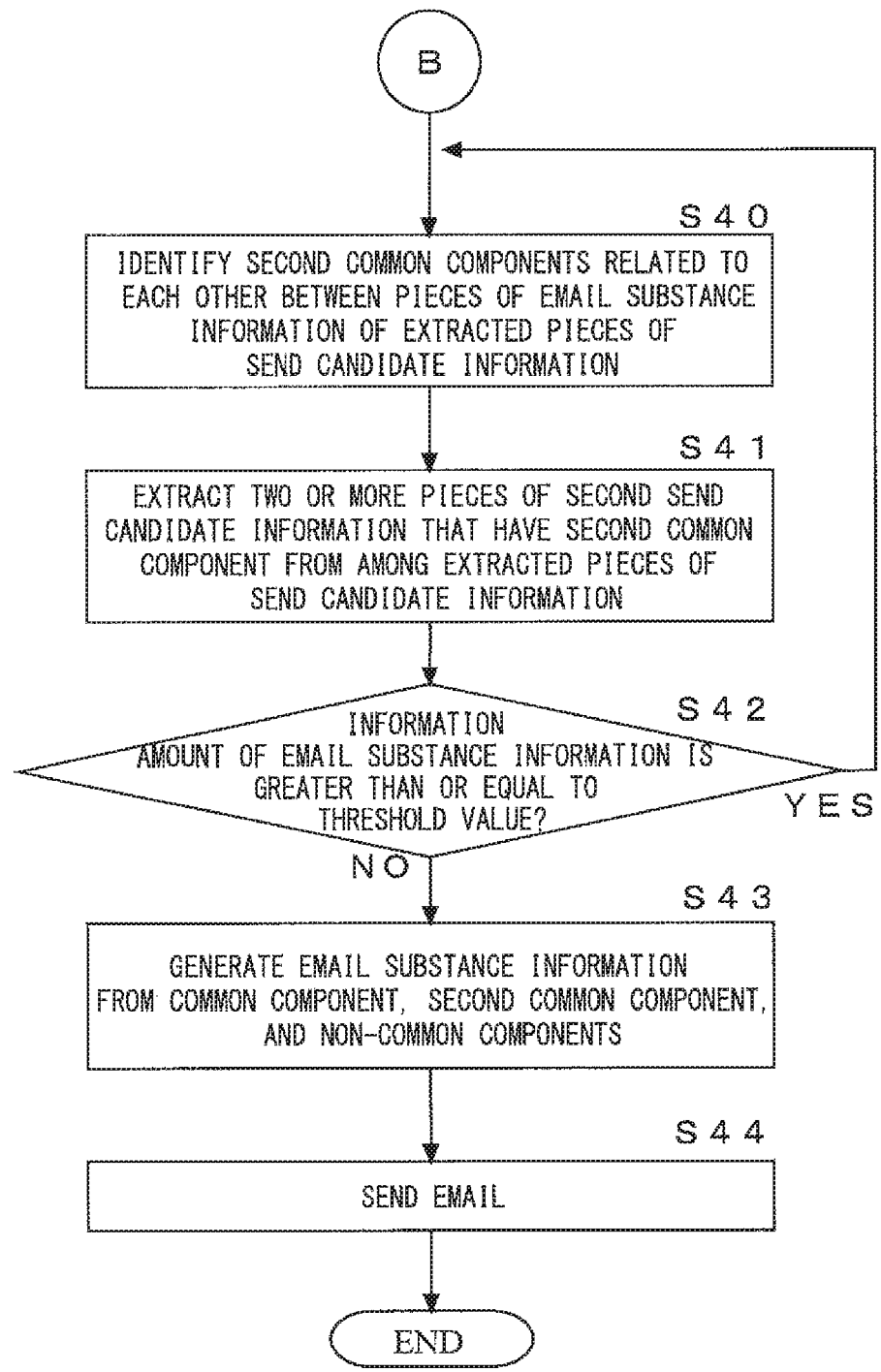
FIG. 21 is a flowchart showing a modification of how to generate an email substance from, for example, a second common component.

As shown in FIGS. 20 and 21, in Step S16, before generating combined email substance information, the information processing server 10 may determines whether the information amount of email substance information is greater than or equal to the threshold value. In this case, the determination can be made before the combined email substance information is generated, and thus the amount of calculation can be reduced.

The following describes a modification of the operation with reference to FIGS. 20 and 21.

As shown in FIG. 20, the information processing server 10 retrieves email substance information as in Steps S10 to S15 (Step S30), analyzes the email substance information (Step S31), stores a recipient, the email substance information and email substance analysis information, and other information as send candidate information in association with each other (Step S32), extracts pieces of send candidate information that have the same recipient (Step S33), identifies common components related to each other between the pieces of email substance information of the extracted pieces of send candidate information (Step S34), and extracts two or more pieces of send candidate information that have the common components (Step S35).

Subsequently, the information processing server 10 determines whether the information amount of the email substance information is greater than or equal to the threshold value (Step S36). Specifically, the system controller 14 calculates the information amount of the components of all the email substances included in two or more pieces of send candidate information extracted by the extracting means (specifically, the sum of the number of common components and the number of non-common components in the emails to be combined). For example, as shown in FIG. 16, the system controller 14 calculates the total information amount of the components a to k. Then, the system controller 14 determines whether the total information amount of the requirements is greater than or equal to the threshold value.

If the information amount of the email substance information is not greater than or equal to the threshold value (NO in Step S36), the information processing server 10 generates email substance information from the common component and non-common components as in Step S16 (Step S37), and sends an email as in Step S18 (Step S38).

If the information amount of the email substance information is greater than or equal to the threshold value (YES in Step S36), as shown in FIG. 21, the information processing server 10 identifies second common components related to each other between the pieces of email substance information of some of the extracted pieces of send candidate information, as in Step S20 (Step S40).

Subsequently, the information processing server 10 extracts two or more pieces of second send candidate information that have the second common component from among the extracted pieces of send candidate information, as in Step S21 (Step S41).

Next, the information processing server 10 determines whether the information amount of the email substance information is greater than or equal to the threshold value (Step S42). Specifically, as in Step S36, the system controller 14 calculates the total of the information amount of the common component, the information amount of the second common component, and the information amount of the non-common components, in the emails to be combined. For example, as shown in FIG. 18, the system controller 14 calculates the total information amount of the requirement a (the common component), the requirement b (a second common component), and the requirements c, d, e, and f. Alternatively, the system controller 14 calculates the total information amount of the requirement a (the common component), the requirement g (a second common component), and the requirements h, i, j, and k. Then, the system controller 14 determines whether the total information amount of the requirements is greater than or equal to the threshold value.

If the information amount of the email substance information is not greater than or equal to the threshold value (NO in Step S42), the information processing server 10 generates email substance information from the common component, the second common component, and non-common components as in Step S22 (Step S43), and sends an email as in Step S24 (Step S44).

If the information amount of the email substance information is greater than or equal to the threshold value (YES in Step S42), the information processing server 10 causes the process to return to Step S40. The information processing server 10 further extracts a third common component in Step S41 to make the information amount of the generated email substance information less than the threshold value.

In this manner, the information processing server 10 also functions as an example of the extracting means. When the total number of components of all the email substances included in two or more pieces of send candidate information extracted by the extracting means is greater than or equal to the second threshold value, the extracting means further extracts, from among the extracted pieces of send candidate information, two or more pieces of second send candidate information that each have at least one of the components that is different from the common components and related between their email substances. The information processing server 10 also functions as another example of the extracting means. When the total number of components of all the email substances included in the two or more pieces of send candidate information extracted by the extracting means, which is obtained by counting the common components as one component and by counting each component other than the common components as one component, among the components of the email substances included in the two or more extracted pieces of send candidate information, is greater than or equal to the third threshold value, the extracting means further extracts, from among the extracted pieces of send candidate information, two or more pieces of second send candidate information that each have at least one of the components that is different from the common components and related between their email substances.

Steps S11 and S12 (the process for analyzing the email substance information) may be skipped. The information processing server 10 retrieves item information of the send candidate information from the email information DB 12d. The information processing server 10 retrieves, from the email information DB 12d, the components of the email substance of the stored send candidate information already analyzed. Subsequently, the information processing server 10 extracts pieces of send candidate information that have the same recipient (Step S13), identifies common components related to each other between the pieces of email substance information of the extracted pieces of send candidate information (Step S14), extracts two or more pieces of send candidate information that have the common components (Step S15), generates email substance information from the common components and the non-common components (Step S16), and determines whether the information amount of the generated email substance information is greater than or equal to the threshold value (Step S17). If the information amount of the generated email substance information is not greater than or equal to the threshold value, the information processing server 10 sends an email (Step S18).

In addition, the present invention is not limited to the above embodiments. The above embodiments are merely examples. Any other embodiment that has essentially the same configuration and produces a similar effect as the technical ideas described in the claims of the present invention falls within the scope of the invention.

REFERENCE SIGNS LIST

1: email delivery system
3: network
10: information processing server (email generation device)
12: storage unit
12d: email information DB (send candidate information storage means)
12e: related component information DB
12f: history information DB
20: store terminal device
30: user terminal device (terminal device)
50, 55, 56, 60A, 60B, 60C, 60D, 60E, 60F, 60G: email substance information (email substance)
51, 52, 53, 61, 62: component

The invention claimed is:
1. An email generation device comprising:
send candidate information storage configured to store a plurality of pieces of send candidate information, each piece of send candidate information having recipient identification information identifying a recipient of an email and an email substance that are associated with each other, the email substance including a plurality of components;
at least one memory operable to store program code; and
at least one processor operable to access said memory, read said program code, and operate according to said program code, said program code including:
  extracting code configured to cause at least one of the at least one processor to extract, from among the stored pieces of send candidate information, two or more pieces of send candidate information that have the same recipient identification information and at least one of the components related between email substances thereof;
  email substance generating code configured to cause at least one of the at least one processor to generate an email substance to be sent to the recipient, based on common components related between the email substances of the extracted pieces of send candidate information and on components that are included in the email substances of the extracted pieces of send candidate information and that are other than the common components, and
  email sending code configured to cause at least one of the at least one processor to send the email only when the generated email substance is below a sending threshold value, wherein when an information amount of the generated email substance is greater than or equal to a first threshold value, the extracting code is further configured to cause at least one of the at least one processor to extract, from among the extracted pieces of send candidate information, two or more pieces of second send candidate information that each have at least one of the components that is different from the common components and related between email substances thereof, and the email substance generating code is further configured to cause at least one of the at least one processor to generate an email substance to the recipient, based on second common components related between the email substances of at least some of the extracted pieces of second send candidate information and on components that are included in the email substances of the extracted pieces of second send candidate information and that are other than the second common components, wherein the first threshold value is the sending threshold value, or wherein when a total number of components of all email substances included in two or more extracted pieces of send candidate information is greater than or equal to a second threshold value, the extracting code is further configured to cause at least one of the at least one processor to extract, from among the extracted pieces of send candidate information, two or more pieces of second send candidate information that each have at least one of the components that is different from the common components and related between email substances thereof, and the email substance code is further configured to cause at least one of the at least one processor to generate an email substance to the recipient, based on second common components related between the email substances of at least some of the extracted pieces of second send candidate information and on components that are included in the email substances of the extracted pieces of second send candidate information and that are other than the second common components wherein the second threshold value is the sending threshold value.

2. An email generation device comprising:

send candidate information storage configured to store a plurality of pieces of send candidate information, each piece of send candidate information having recipient identification information identifying a recipient of an email and an email substance that are associated with each other, the email substance including a plurality of components;

at least one memory operable to store program code; and at least one processor operable to access said memory, read said program code, and operate according to said program code, said program code including:

extracting code configured to cause at least one of the at least one processor to extract, from among the stored pieces of send candidate information, two or more pieces of send candidate information that have the same recipient identification information and at least one of the components related between email substances thereof;

email substance generating code is further configured to cause at least one of the at least one processor to generate an email substance to be sent to the recipient, based on common components related between the email substances of the extracted pieces of send candidate information and on components that are included in the email substances of the extracted pieces of send candidate information and that are other than the common components, and email sending code configured to cause at least one of the at least one processor to send the email only when the generated email substance is below a sending threshold value, wherein when a number of pieces of send candidate information that are stored in the send candidate information storage and that correspond to the recipient identification information is greater than or equal to a fifth threshold value, the extracting code is further configured to cause at least one of the at least one processor to extract, from among the stored pieces of send candidate information, two or more pieces of send candidate information that have the same recipient identification information and at least one of the components related between email substances thereof, and the fifth threshold value is set based on an elapsed time since a previous sent time corresponding to the recipient identification information, wherein the fifth threshold value is the sending threshold value, or wherein when the number of pieces of send candidate information that are stored in the send candidate information storage and that correspond to the recipient identification information is greater than or equal to a sixth threshold value, the extracting code is further configured to cause at least one of the at least one processor to extract, from among the stored pieces of send candidate information, two or more pieces of send candidate information that have the same recipient identification information and at least one of the components related between email substances thereof, and the sixth threshold value is set based on a traffic on a communication line for sending the email, and wherein the sixth threshold value is the sending threshold value.

3. The email generation device according to claim 1, wherein when the total number of components of all email substances included in two or more extracted pieces of send candidate information, which is obtained by counting common components as one component and by counting each component other than the common components as one component, among components of email substances included in the two or more extracted pieces of send candidate information, is greater than or equal to a third threshold value, the extracting code is further configured to cause at least one of the at least one processor to extract, from among the extracted pieces of send candidate information, two or more pieces of second send candidate information that each have at least one of the components that is different from the common components and related between email substances thereof.

4. The email generation device according to claim 2, wherein when the total number of components of all email substances included in two or more extracted pieces of send candidate information, which is obtained by counting common components as one component and by counting each component other than the common components as one component, among components of email substances included in the two or more extracted pieces of send candidate information, is greater than or equal to a third threshold value, the extracting code is further configured to cause at least one of the at least one processor to extract, from among the extracted pieces of send candidate information, two or more pieces of second send candidate information that each have at least one of the components that is different from the common components and related between email substances thereof.

5. The email generation device according to claim 1, wherein the send candidate information storage is further configured to store:
  sent time at which an email including the send candidate information was sent to the recipient identification information, and
  two or more emails that have both the same recipient identification information and the same category to which an item corresponding to item identification information belongs and whose difference between the sent time and the current time is less than or equal to a fourth threshold value are extracted, and at least one of the first, second, and third threshold values is set based on components in the email substance of an email that was handled by a user corresponding to the recipient identification information and on components in the email substance of an email that was not handled by the user, among the extracted emails.

6. The email generation device according to claim 2, wherein the send candidate information storage is further configured to store:
  sent time at which an email including the send candidate information was sent to the recipient identification information, and
  two or more emails that have both the same recipient identification information and the same category to which an item corresponding to item identification information belongs and whose difference between the sent time and the current time is less than or equal to a fourth threshold value are extracted, and at least one of the first, second, and third threshold values is set based on components in the email substance of an email that was handled by a user corresponding to the recipient identification information and on components in the email substance of an email that was not handled by the user, among the extracted emails.

7. The email generation device according to claim 3, wherein the send candidate information storage is further configured to store:
  sent time at which an email including the send candidate information was sent to the recipient identification information, and
  two or more emails that have both the same recipient identification information and the same category to which an item corresponding to item identification information belongs and whose difference between the sent time and the current time is less than or equal to a fourth threshold value are extracted, and at least one of the first, second, and third threshold values is set based on components in the email substance of an email that was handled by a user corresponding to the recipient identification information and on components in the email substance of an email that was not handled by the user, among the extracted emails.

8. An email generation method, performed by a computer, comprising:
  storing a plurality of pieces of send candidate information, each piece of send candidate information having recipient identification information identifying a recipient of an email and an email substance that are associated with each other, the email substance including a plurality of components;
  extracting, from among the stored pieces of send candidate information, two or more pieces of send candidate information that have the same recipient identification information and at least one of the components related between email substances thereof;
  generating an email substance to be sent to the recipient, based on common components related between the email substances of the extracted pieces of send candidate information and on components that are included in the email substances of the extracted pieces of send candidate information and that are other than the common components, and
  sending the email only when the generated email substance is below a sending threshold value, wherein
  when an information amount of the email substance generated in the email substance generating step is greater than or equal to a first threshold value, the extracting further includes extracting, from among the extracted pieces of send candidate information, two or more pieces of second send candidate information that each have at least one of the components that is different from the common components and related between email substances thereof, and
  the generating further includes generating an email substance to the recipient, based on second common components related between the email substances of at least some of the extracted pieces of second send candidate information and on components that are included in the email substances of the extracted pieces of second send candidate information and that are other than the second common components, wherein the first threshold value is the sending threshold value, or wherein
  when a total number of components of all email substances included in two or more extracted pieces of send candidate information is greater than or equal to a second threshold value, the extracting further includes extracting, from among the extracted pieces of send candidate information, two or more pieces of second send candidate information that each have at least one of the components that is different from the common components and related between email substances thereof, and
  the generating further includes generating an email substance to the recipient, based on second common components related between the email substances of at least some of the extracted pieces of second send candidate information and on components that are included in the email substances of the extracted pieces of second send candidate information and that are other than the second common components, wherein the second threshold value is the sending threshold value.

9. An email generation method, performed by a computer, comprising:
  storing, in a send candidate information storage, a plurality of pieces of send candidate information, each piece of send candidate information having recipient identification information identifying a recipient of an email and an email substance that are associated with each other, the email substance including a plurality of components;

extracting, from among the stored pieces of send candidate information, two or more pieces of send candidate information that have the same recipient identification information and at least one of the components related between email substances thereof;

generating an email substance to be sent to the recipient, based on common components related between the email substances of the extracted pieces of send candidate information and on components that are included in the email substances of the extracted pieces of send candidate information and that are other than the common components, and sending the email only when the generated email substance is below a sending threshold value, wherein when a number of pieces of send candidate information that are stored in the send candidate information storage and that correspond to the recipient identification information is greater than or equal to a fifth threshold value, the extracting further includes extracting, from among the stored pieces of send candidate information, two or more pieces of send candidate information that have the same recipient identification information and at least one of the components related between email substances thereof, and the fifth threshold value is set based on an elapsed time since a previous sent time corresponding to the recipient identification information, wherein the fifth threshold value is the sending threshold value, or wherein when the number of pieces of send candidate information that are stored in the send candidate information storage and that correspond to the recipient identification information is greater than or equal to a sixth threshold value, the extracting further includes extracting, from among the stored pieces of send candidate information, two or more pieces of send candidate information that have the same recipient identification information and at least one of the components related between email substances thereof, and the sixth threshold value is set based on a traffic on a communication line for sending the email, and wherein the sixth threshold value is the sending threshold value.

* * * * *